US010645141B2

(12) United States Patent
Ko et al.

(10) Patent No.: US 10,645,141 B2
(45) Date of Patent: May 5, 2020

(54) MOBILE TERMINAL AND METHOD FOR CONTROLLING THE SAME

(71) Applicant: LG ELECTRONICS INC., Seoul (KR)

(72) Inventors: Eulina Ko, Seoul (KR); Hosoo Kim, Seoul (KR); Chaesung Leem, Seoul (KR); Jihwan Park, Seoul (KR); Younghan Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 696 days.

(21) Appl. No.: 14/723,926

(22) Filed: May 28, 2015

(65) Prior Publication Data

US 2016/0062599 A1 Mar. 3, 2016

(30) Foreign Application Priority Data

Aug. 29, 2014 (KR) .......................... 10-2014-0114378

(51) Int. Cl.
*G06F 3/048* (2013.01)
*H04L 29/08* (2006.01)
(Continued)

(52) U.S. Cl.
CPC ............ *H04L 67/02* (2013.01); *G06F 16/951* (2019.01); *G06F 16/955* (2019.01);
(Continued)

(58) Field of Classification Search
CPC ..... H04L 67/02; G06F 3/14; G06F 17/30864; G06F 17/3089; G06F 17/30876;
(Continued)

(56) References Cited

U.S. PATENT DOCUMENTS 9,152,624 B1 * 10/2015 Krallman ................ G06F 17/30
9,671,941 B1 * 6/2017 Gray ..................... G06K 9/2081
(Continued)

FOREIGN PATENT DOCUMENTS

CN 102893327 1/2013
CN 103279381 9/2013
(Continued)

OTHER PUBLICATIONS

Written Opinion and International Search Report for PCT/KR2015/006980 dated Oct. 19, 2015.
(Continued)

*Primary Examiner* — Mohamed Abou El Seoud
(74) *Attorney, Agent, or Firm* — KED & Associates LLP

(57) ABSTRACT

Provided are a mobile terminal capable of capturing an image and a control method thereof. The mobile terminal includes: a display unit configured to output an automatic scrap icon and a manual scrap icon for selecting first screen information and partial screen information included in the first screen information; and a control unit configured to, in response to a preset touch input applied to the automatic scrap icon, extract meta data regarding the first screen information, select partial screen information included in the first screen information on the basis of the extracted meta data, generate second screen information including the selected partial screen information, and control the display unit to output the generated second screen information.

18 Claims, 22 Drawing Sheets

(51) Int. Cl.
  *G06F 16/951* (2019.01)
  *G06F 16/958* (2019.01)
  *G06Q 50/00* (2012.01)
  *G06F 16/955* (2019.01)
  *G06F 3/0488* (2013.01)
  *G06F 3/0484* (2013.01)
  *H04L 29/06* (2006.01)

(52) U.S. Cl.
  CPC .......... *G06F 16/958* (2019.01); *G06Q 50/01* (2013.01); *G06F 3/0488* (2013.01); *G06F 3/04842* (2013.01); *H04L 67/38* (2013.01)

(58) Field of Classification Search
  CPC ..... G06F 17/3061; G06F 17/30; G06Q 30/00; G06Q 10/109; G06Q 10/10; G06Q 10/00; G06Q 10/06; Y02P 90/12; G05B 19/41885; G05B 23/0278
  See application file for complete search history.

(56) References Cited

U.S. PATENT DOCUMENTS

| | | | |
|---|---|---|---|
| 9,965,152 B2 | 5/2018 | Park | |
| 2011/0041169 A1* | 2/2011 | De Luca | G06F 3/04817 726/7 |
| 2011/0138316 A1 | 6/2011 | Park et al. | |
| 2011/0164163 A1* | 7/2011 | Bilbrey | G06F 1/1694 348/333.01 |
| 2012/0095983 A1* | 4/2012 | Lee | G06F 3/0483 707/706 |
| 2012/0143598 A1* | 6/2012 | Bandara | G06F 17/30241 704/10 |
| 2013/0117643 A1 | 5/2013 | Yang et al. | |
| 2013/0191769 A1 | 7/2013 | Park et al. | |
| 2013/0318063 A1* | 11/2013 | Ayzenshtat | G06F 16/951 707/707 |
| 2014/0123018 A1* | 5/2014 | Park | G06F 3/0484 715/738 |
| 2014/0304118 A1* | 10/2014 | Cho | G06Q 30/0629 705/26.64 |
| 2014/0359415 A1 | 12/2014 | Song et al. | |
| 2014/0365851 A1* | 12/2014 | Kroupa | G06F 17/2229 715/205 |
| 2015/0046827 A1* | 2/2015 | Akselrod | G06F 21/6218 715/738 |
| 2015/0058369 A1* | 2/2015 | Kong | G06F 9/4443 707/756 |
| 2015/0134641 A1* | 5/2015 | Yokoyama | G06F 16/93 707/722 |
| 2016/0142872 A1* | 5/2016 | Nicholson | H04W 4/021 455/456.1 |
| 2017/0289341 A1 | 10/2017 | Rodriguez et al. | |

FOREIGN PATENT DOCUMENTS

| | | |
|---|---|---|
| CN | 103813007 | 5/2014 |
| KR | 10-2010-0123134 A | 11/2010 |
| KR | 10-2011-0064082 A | 6/2011 |
| KR | 10-2013-0034636 A | 4/2013 |
| KR | 10-2013-0048926 A | 5/2013 |
| WO | WO 2011/116309 | 9/2011 |
| WO | WO 2013/066094 | 5/2013 |

OTHER PUBLICATIONS

European Search Report dated Jan. 12, 2018 issued in Application No. 15835946.3.
Chinese Office Action dated Jul. 3, 2019 issued in Application 201580045667.6 (full Chinese text and English translation).

* cited by examiner

MOBILE TERMINAL AND METHOD FOR CONTROLLING THE SAME

CROSS-REFERENCE TO RELATED APPLICATION(S)

This application claims priority under 35 U.S.C. § 119 to Korean Application No. 10-2014-0114378 filed in Korea on Aug. 29, 2014, whose entire disclosure is hereby incorporated by reference.

BACKGROUND

1. Field

The present disclosure relates to a mobile terminal capable of capturing an image and a control method thereof.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals are implemented in the form of a multimedia player including composite functions such as capturing images or video, reproducing music or video files, playing games, receiving broadcast signals, and the like.

In order to support and increase functions of terminals, improvement of structural parts and/or software parts of terminals may be taken into consideration.

Terminals may capture an execution screen of an application or a search screen of a web page and store the same. Here, it may be difficult to selectively capture or clip only a portion of screen contents. Also, in a case in which a user clips a portion of a screen image and sends it to a terminal of a different user, if the terminal of the different user does not support an application for the received portion of the screen application, an image and text thereof are separated to be shared.

The above references are incorporated by reference herein where appropriate for appropriate teachings of additional or alternative details, features and/or technical background.

SUMMARY OF THE INVENTION

Accordingly, an aspect of the present invention is to address the above-noted and other problems.

Another aspect of the present invention is to provide a mobile terminal capable of automatically generating a clipped image, and a method for controlling the same.

To achieve these and other advantages and in accordance with the purpose of this specification, as embodied and broadly described herein, a mobile terminal includes: a display unit configured to output an automatic scrap icon and a manual scrap icon for selecting first screen information and partial screen information included in the first screen information; and a control unit configured to, in response to a preset touch input applied to the automatic scrap icon, extract meta data regarding the first screen information, select partial screen information included in the first screen information on the basis of the extracted meta data, generate second screen information including the selected partial screen information, and control the display unit to output the generated second screen information.

In an exemplary embodiment of the present disclosure, the display unit may output a scrap window for selecting partial screen information included in the first screen information in response to a preset touch input applied to the manual scrap icon, and, in response to the preset touch input applied to the manual scrap icon, the control unit may extract meta data regarding the first screen information, select (1-1)th screen information as partial screen information included in the first screen information on the basis of the extracted meta data, and control the display unit to output the selected (1-1)th screen information on the scrap window, and, in response to a preset touch input applied to (1-2)th screen information as partial screen information included in the first screen information, the control unit may control the display unit to output the (1-2)th screen information on the scrap window.

In an exemplary embodiment of the present disclosure, in response to a preset touch input applied to a manual scrap completion icon for completing selection of partial screen information included in the first screen information, the control unit may generate third screen information including the (1-1)th screen information and the (1-2)th screen information output on the scrap window, and control the display unit to output the generated third screen information.

In an exemplary embodiment of the present disclosure, in response to a preset touch input applied to partial screen information included in the second screen information, the control unit may generate fourth screen information by editing the second screen information such that the fourth screen information includes screen information related to the partial screen information, and control the display unit to output the generated fourth screen information.

In an exemplary embodiment of the present disclosure, the control unit may extract at least one among a keyword, a uniform resource locator (URL), a tag, a location, and a contact number extracted from the first screen information, as meta data regarding the first screen information.

In an exemplary embodiment of the present disclosure, the display unit may output at least one of an icon for sharing the second screen information, an icon for outputting the first screen information, an icon for outputting a location extracted from the second screen information, and an icon for making a call to a contact number extracted from the second screen information, together with the second screen information.

In an exemplary embodiment of the present disclosure, when the current location of the terminal is within a preset range from a location extracted from the second screen information, the control unit may control the display unit to output a message indicating that the current location of the terminal is close to the location extracted from the second screen information.

In an exemplary embodiment of the present disclosure, the control unit may search content related to the second screen information from a memory on the basis of the meta data regarding the second screen information, and control the display unit to output the searched content.

In an exemplary embodiment of the present disclosure, in response to a preset touch input applied to partial screen information included in the second screen information, the control unit may control the display unit to output a result obtained by searching the partial screen information from a web page.

In an exemplary embodiment of the present disclosure, on the basis of an object selected by a user and meta data regarding each of a plurality of screen information stored in the memory, the control unit may extract at least one screen information related to the selected object and control the display unit to output the at least one extracted screen information.

To achieve these and other advantages and in accordance with the purpose of this specification, as embodied and broadly described herein, a method for controlling a mobile terminal includes: (a) outputting an automatic scrap icon and a manual scrap icon for selecting first screen information and partial screen information included in the first screen information; (b) in response to a pre-set touch input applied to the automatic scrap icon, extracting meta data regarding the first screen information and selecting partial screen information included in the first screen information on the basis of the extracted meta data; and (c) generating second screen information including the selected partial screen information and outputting the generated second screen information.

In an exemplary embodiment of the present disclosure, operation (b) may include: (b1) in response to a preset touch input applied to the manual scrap icon, outputting a scrap window for selecting partial screen information included in the first screen information; (b2) extracting meta data regarding the first screen information, selecting (1-1)th screen information as partial screen information included in the first screen information on the basis of the extracted meta data, and outputting the selected (1-1)th screen information on the scrap window; and (b3) in response to a preset touch input applied to (1-2)th screen information as partial screen information included in the first screen information, outputting the (1-2)th screen information on the scrap window.

In an exemplary embodiment of the present disclosure, operation (c) may include: in response to a preset touch input applied to a manual scrap completion icon for completing selection of partial screen information included in the first screen information, generating third screen information including the (1-1)th screen information and the (1-2)th screen information output on the scrap window, and outputting the generated third screen information.

In an exemplary embodiment of the present disclosure, the method may further include: in response to a preset touch input applied to partial screen information included in the second screen information, generating fourth screen information by editing the second screen information such that the fourth screen information includes screen information related to the partial screen information, and outputting the generated fourth screen information.

In an exemplary embodiment of the present disclosure, operation (b) may include: extracting at least one among a keyword, a uniform resource locator (URL), a tag, a location, and a contact number extracted from the first screen information, as meta data regarding the first screen information.

In an exemplary embodiment of the present disclosure, the method may further include: outputting at least one of an icon for sharing the second screen information, an icon for outputting the first screen information, an icon for outputting a location extracted from the second screen information, and an icon for making a call to a contact number extracted from the second screen information, together with the second screen information.

In an exemplary embodiment of the present disclosure, the method may further include: when the current location of the terminal is within a preset range from a location extracted from the second screen information, outputting a message indicating that the current location of the terminal is close to the location extracted from the second screen information.

In an exemplary embodiment of the present disclosure, the method may further include: searching content related to the second screen information from a memory on the basis of the meta data regarding the second screen information, and outputting the searched content.

In an exemplary embodiment of the present disclosure, the method may further include: in response to a preset touch input applied to partial screen information included in the second screen information, outputting a result obtained by searching the partial screen information from a web page.

In an exemplary embodiment of the present disclosure, the method may further include: on the basis of an object selected by a user and meta data regarding each of a plurality of screen information stored in the memory, extracting at least one screen information related to the selected object and outputting the at least one extracted screen information.

Further scope of applicability of the present application will become more apparent from the detailed description given hereinafter. However, it should be understood that the detailed description and specific examples, while indicating preferred exemplary embodiments of the invention, are given by way of illustration only, since various changes and modifications within the spirit and scope of the invention will become apparent to those skilled in the art from the detailed description.

BRIEF DESCRIPTION OF THE DRAWINGS

The embodiments will be described in detail with reference to the following drawings in which like reference numerals refer to like elements wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
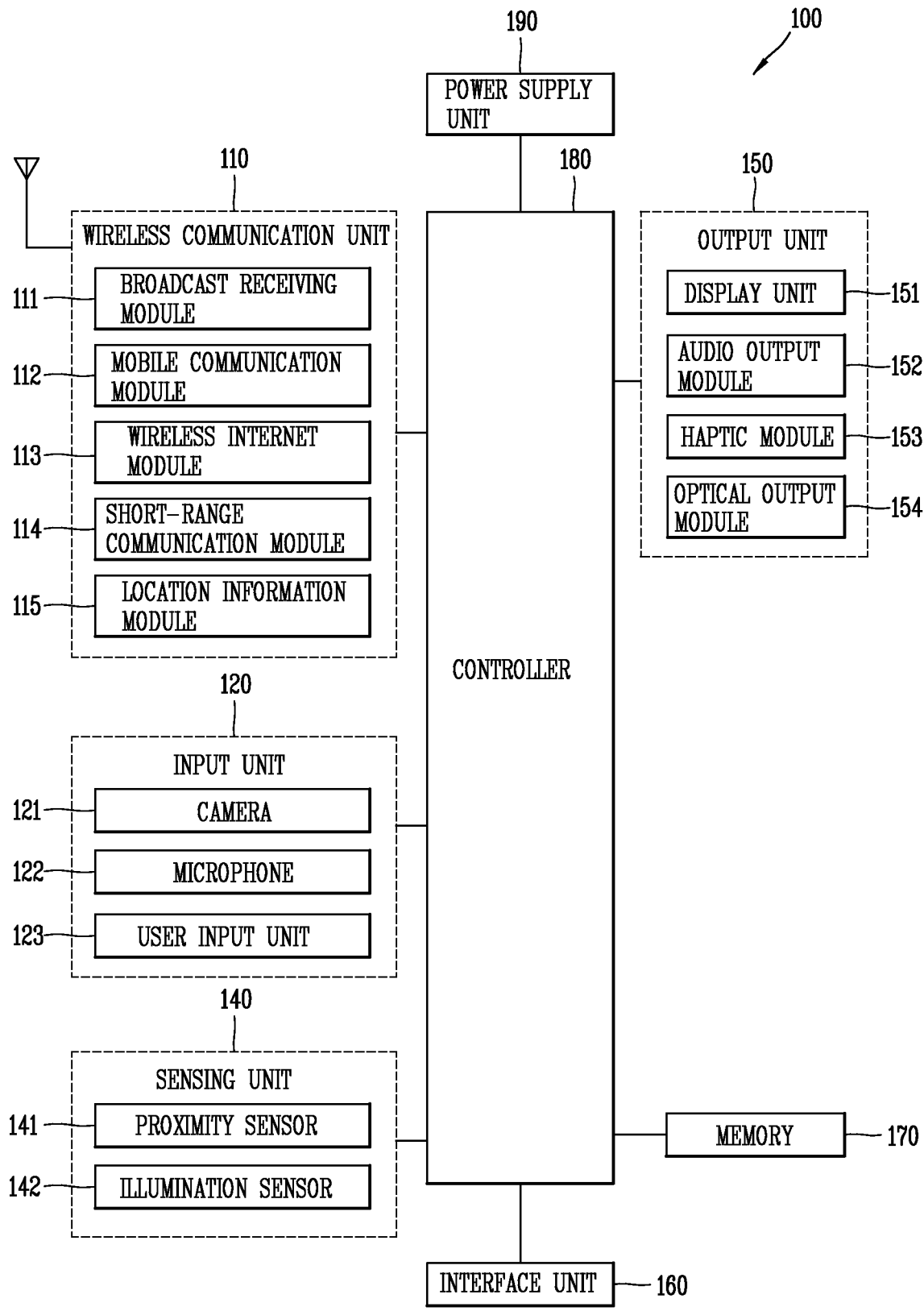
FIG. 1A is a block diagram of a mobile terminal in accordance with the present disclosure.
Figure 1B:
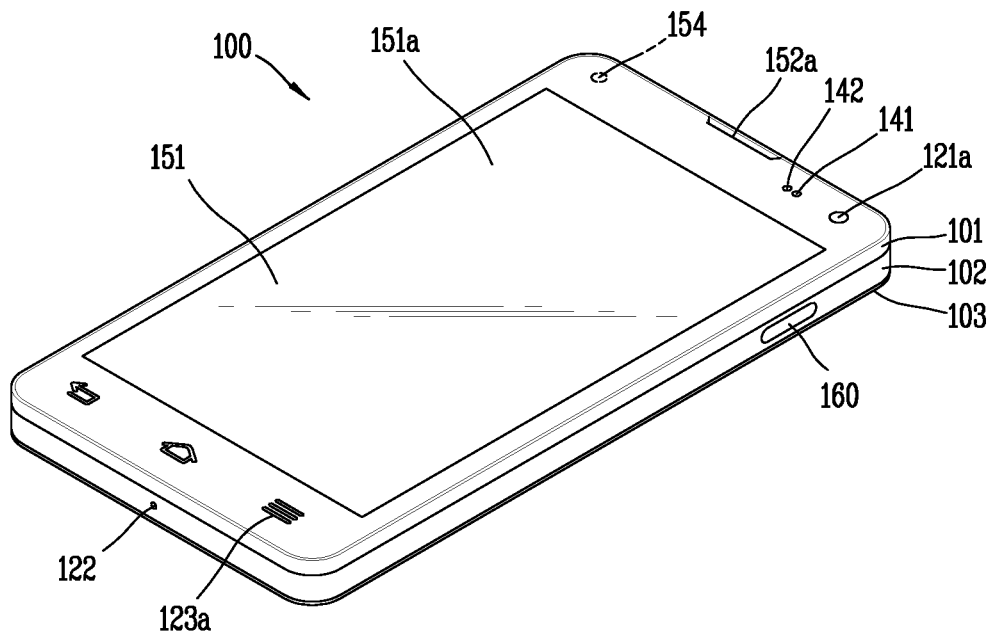
FIGS. 1B and 1C are conceptual views of one example of the mobile terminal, viewed from different directions.
Figure 1C:
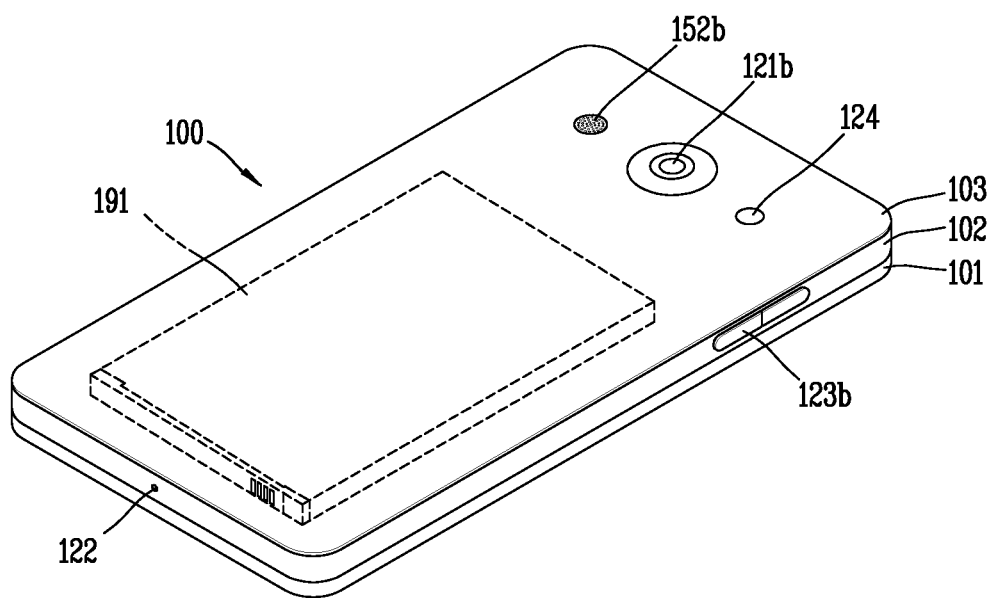
Figure 10:
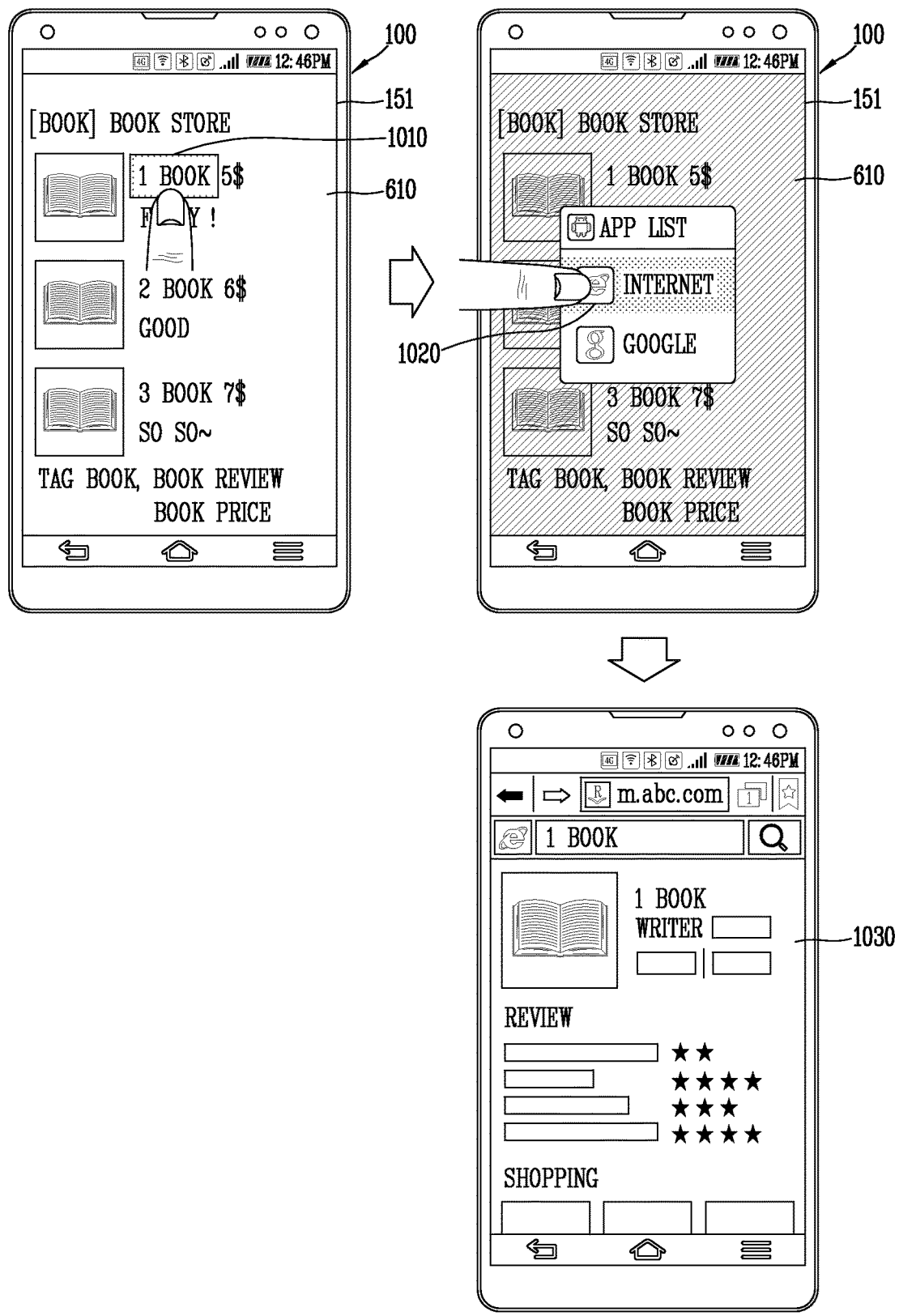
FIG. 10 is a conceptual view illustrating an exemplary embodiment of a user interface in which a particular object included in a scrap image is searched from a web page.

Reference is now made to FIGS. 1A-1C, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include the display unit 151, the first audio output module 152*a*, the second audio output module 152*b*, the proximity sensor 141, the illumination sensor 142, the optical output module 154, the first camera 121*a*, the second camera 121*b*, the first manipulation unit 123*a*, the second manipulation unit 123*b*, the microphone 122, the interface unit 160, etc.

Hereinafter, the mobile terminal 100 will be explained with reference to FIGS. 1B and 1B. The display unit 151, the first audio output module 152*a*, the proximity sensor 141, the illumination sensor 142, the optical output module 154, the first camera 121*a* and the first manipulation unit 123*a* are arranged on the front surface of the terminal body. The second manipulation unit 123*b*, the microphone 122 and the interface unit 160 are arranged on the side surfaces of the terminal body. The second audio output module 152*b* and the second camera 121*b* are arranged on the rear surface of the terminal body.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output unit 152*a* may be implemented as a receiver for transmitting a call sound to a user's ears, and the second audio output unit 152*b* may be implemented as a loud speaker for outputting each type of alarm sounds or a play sound of multimedia.

It may be configured such that the sounds generated from the first audio output module 152*a* are released along an assembly gap between the structural bodies (e.g., between the window 151*a* and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121*a* processes image data of still pictures or video acquired by an image capture device in a video capturing mode or an image capturing mode. The processed image frames may be displayed on the display unit 151, or may be stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may be implemented in a user's non-tactile manner, e.g., by a proximity touch, a hovering touch, etc.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that can be implemented in the mobile terminal configured as described above will be described with reference to the accompanying drawings. It is apparent to those skilled in the art that modification, alteration, and improvement can be made to the present invention within a scope that does not deviate from the nature and gist of the present invention.

Figure 2:
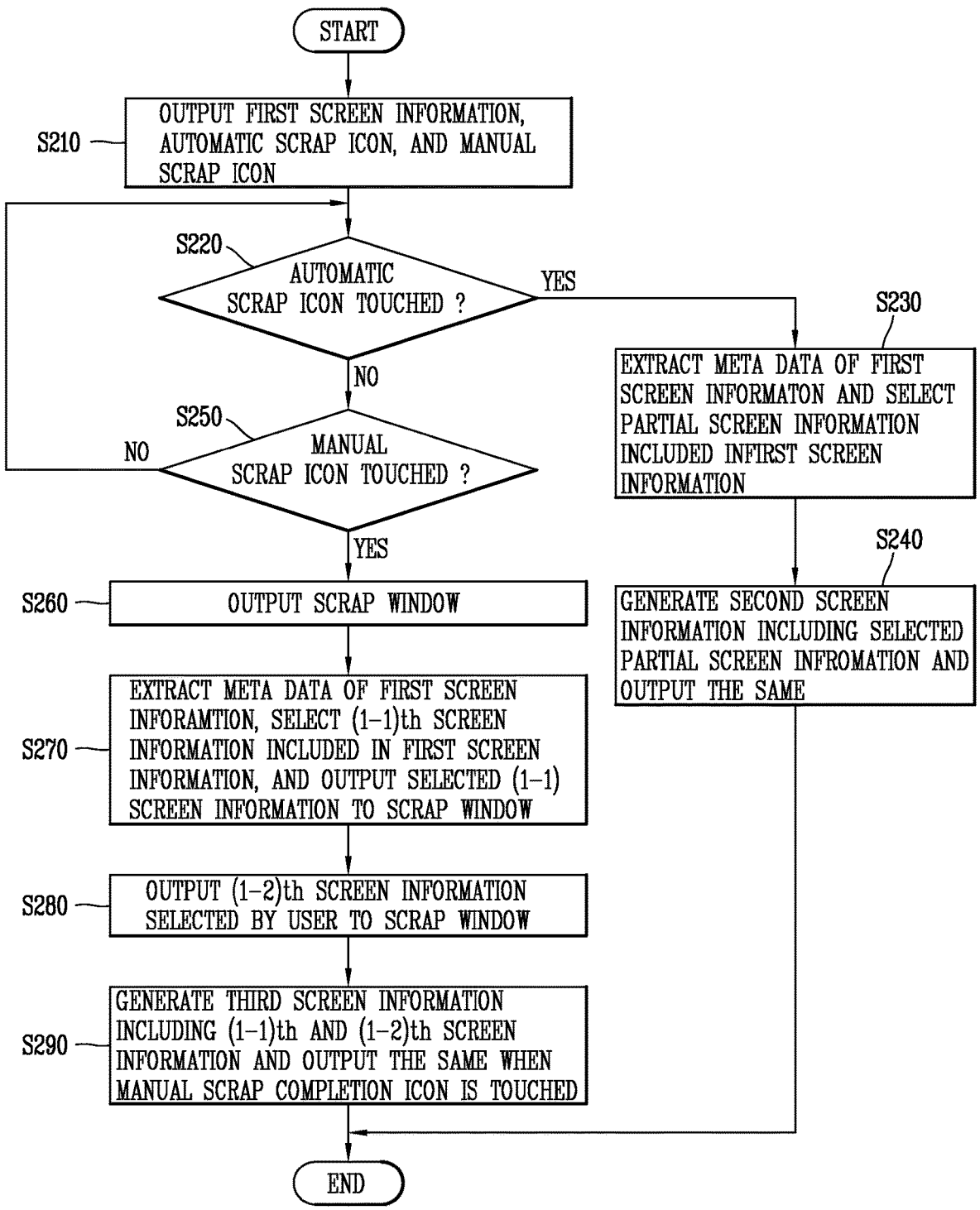
FIG. 2 is a flow chart illustrating a method for controlling a mobile terminal according to an exemplary embodiment of the present disclosure.

FIG. 2 is a flow chart illustrating a method for controlling a mobile terminal according to an exemplary embodiment of the present disclosure.

Referring to FIG. 2, first, an automatic scrap icon and a manual scrap icon for selecting first screen information and partial screen information included in the first screen information are output on a screen 151 in step S210.

In detail, the screen information may be various types of visual information that can be output to the display unit 151. For example, the screen information may be an execution screen of an application, a home screen page, a menu screen, a screen corresponding to a function executed according to a user request, a Web page screen, a notification screen indicating that an event has occurred, and the like.

The partial screen information may be various types of visual information included in screen information which has been output. In an exemplary embodiment, text or an image included in a Web search page may be selected as partial screen information of the Web search page. Also, the automatic scrap icon and the manual scrap ion may be output on screen information or on a status bar.

Subsequently, it is determined whether a pre-set touch input has been applied to the automatic scrap icon in step S220.

Accordingly, when a preset touch input is applied to the automatic scrap icon, meta data regarding the first screen information is extracted, and partial screen information include din the first screen information is selected on the basis of the extracted meta data in step S230.

In detail, meta data regarding screen information is structured data regarding screen information, which refers to data that describes screen information.

In an exemplary embodiment, when the user touches the automatic scrap icon output on the status bar, a keyword, a uniform resource locator (URL), a tag, a position, a contact number, and the like, extracted from the first screen information may be extracted as meta data regarding the first screen information. Also, text mentioning the extracted keyword or an image corresponding to the extracted keyword may be selected as partial screen information of the first screen information.

Thereafter, second screen information including the selected partial screen information is generated and output in step S240.

In an exemplary embodiment, the second screen information may include a title or a tag extracted from the first screen information. Also, the second screen information may include text or images related to a keyword of the first screen information. That is, a portion of text or an image included in the first screen information may be clipped to generated the second screen information.

Meanwhile, in a case in which a pre-set touch input is not applied to the automatic scrap icon, it is determined that a pre-set touch input has been applied to the manual scrap icon in step S250. In an exemplary embodiment, it may be first determined that a preset touch input has been applied to the manual scrap icon.

Thus, when a pre-set touch input is applied to the manual scrap icon, a scrap window allowing the user to select partial screen information included in the first screen information may be output in step S260.

In detail, the scrap window is a separate input window distinguished from the first screen information, and when the user selects partial screen information included in the first screen information, the selected partial screen information is output to the scrap window.

In an exemplary embodiment, the scrap window may be output on a first layer in which the first screen information is output or may be output to a region formed by reducing the size of the first layer such that the scrap window does not overlap the first layer.

Subsequently, meta data regarding the first screen information is extracted, and (1-1)th screen information, partial screen information, included in the first screen information is selected, and the selected (1-1)th screen information is output to the scrap window in step S270.

In an exemplary embodiment, a title and a tag of the first screen information may be selected as the (1-1)th screen information. Accordingly, the title and the tap of the first screen information may be output on the scrap window.

Thereafter, when a preset touch input is applied to (1-2)th screen information, partial screen information included in the first screen information, the (1-2)th screen information is output on the scrap window in response in step S280.

In detail, the (1-2)th screen information refers to an image or text included in the first screen information selected by the user.

In an exemplary embodiment, when the user long-touches an image (the (1-2)th screen information) included in the first screen information, the long-touched image (the (1-2)th screen information) is output to the scrap window.

Thereafter, when a preset touch input is applied to a manual scrap completion icon to complete selection of partial screen information included in the first screen information, third screen information including the (1-1)th screen information and the (1-2)th screen information is generated and output in step S290.

In an exemplary embodiment, when the user touches the manual scrap completion icon output on the scrap window or the first screen information, the scrap window which has been output may disappear and the third screen information including the (1-1)th screen information and the (1-2)th screen information may be displayed.

That is, the third screen information may include a title or a tag selected on the basis of the meta data of the first screen information. Also, the third screen information may include text or an image selected by the user.

In an exemplary embodiment, the third screen information may be configured to be the same as the scrap window. Alternatively, the third screen information may include screen information disposed to be different from that of the scrap window. That is, the third screen information may be generated by clipping text or a portion of an image included in the first screen information selected by the user.

FIG. 3A through 3D are conceptual views illustrating an exemplary embodiment of a user interface in which an automatic scrap icon a manual scrap icon are output.

Figure 3A:
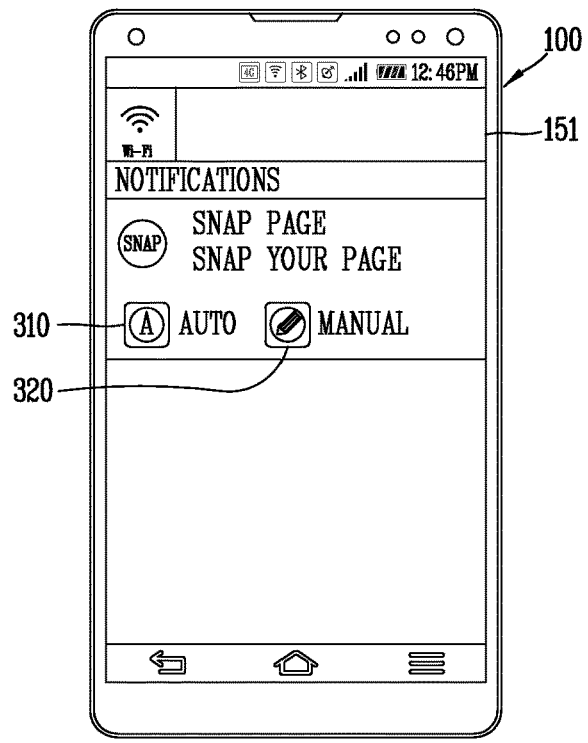
FIG. 3A through 3D are conceptual views illustrating an exemplary embodiment of a user interface in which an automatic scrap icon a manual scrap icon are output.

Referring to FIG. 3A, an automatic scrap icon 310 and a manual scrap icon 320 may be output on a status bar. In an exemplary embodiment, the user may touch the icon 310 or 320 corresponding to a desired scrap mode to select the same.

Figure 3B:
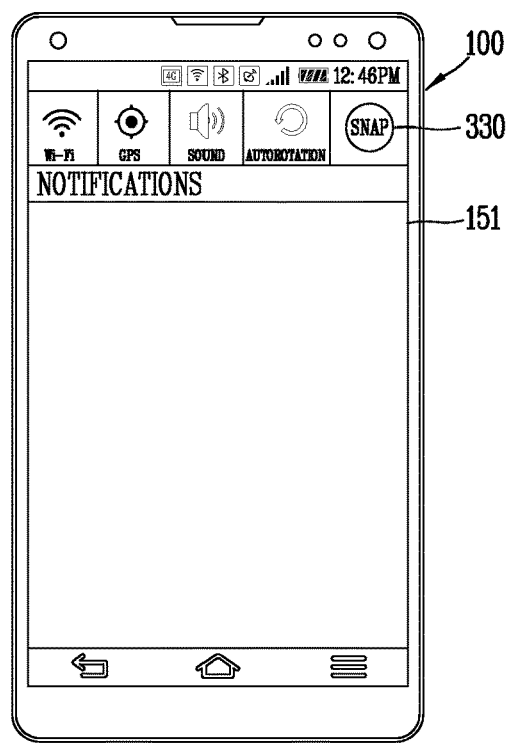

Referring to FIG. 3B, an icon 330 corresponding to an application for clipping screen information may be output on the status bar. In an exemplary embodiment, when the user touches the icon 330, the automatic scrap icon and the manual scrap icon may be output and an application for clipping screen information may be executed.

Figure 3C:
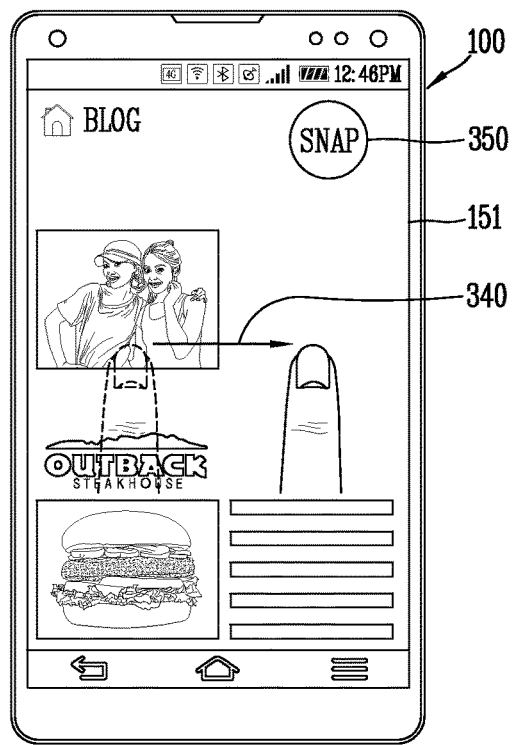

Referring to FIG. 3C, when the user applies a particular preset gesture, the application for clipping screen information may be executed. In an exemplary embodiment, when the user applies a flicking input 340 to a screen 151, the automatic scrap icon 310 and the manual scrap icon 320 may be output and the application for clipping screen information may be executed.

In another exemplary embodiment, an icon 350 corresponding to the application for clipping screen information may have been output on a region of the screen 151 in a pop-up manner. Accordingly, when the user touches the icon 350, the automatic scrap icon 310 and the manual scrap icon 320 may be output and the application for clipping screen information may be executed.

Figure 3D:
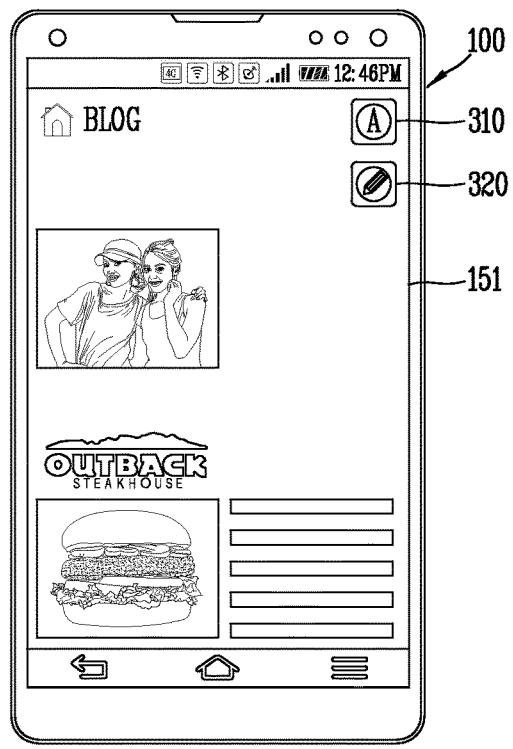

Referring to FIG. 3D, the automatic scrap icon 310 and the manual scrap icon 320 may be output on the screen 151 in a pop-up manner. In an exemplary embodiment, the user may touch the icon 310 or 320 corresponding to a desired scrap mode to select the same.

In another exemplary embodiment, when the user selects a share function while an application is being executed or while the user is performing web searching, an icon corresponding to an application for clipping screen information may be output together with icons corresponding to other applications.

As described above, the display unit 151 may output the automatic scrap icon 310 and the manual scrap icon 320 for selecting the first screen information and partial screen information included in the first screen information.

Also, in response to a preset touch input applied to the automatic scrap icon 310, the control unit 180 may extract meta data regarding the first screen information and select partial screen information included in the first screen information on the basis of the extracted meta data.

In an exemplary embodiment, the control unit 180 may extract at least one among a keyword, a uniform resource locator (URL), a tag, a position, and a contact number extracted from the first screen information, as meta data regarding the first screen information.

Subsequently, the control unit 180 may generate second screen information including the selected partial screen information and control the display unit 151 to output the generated second screen information.

Figure 4:
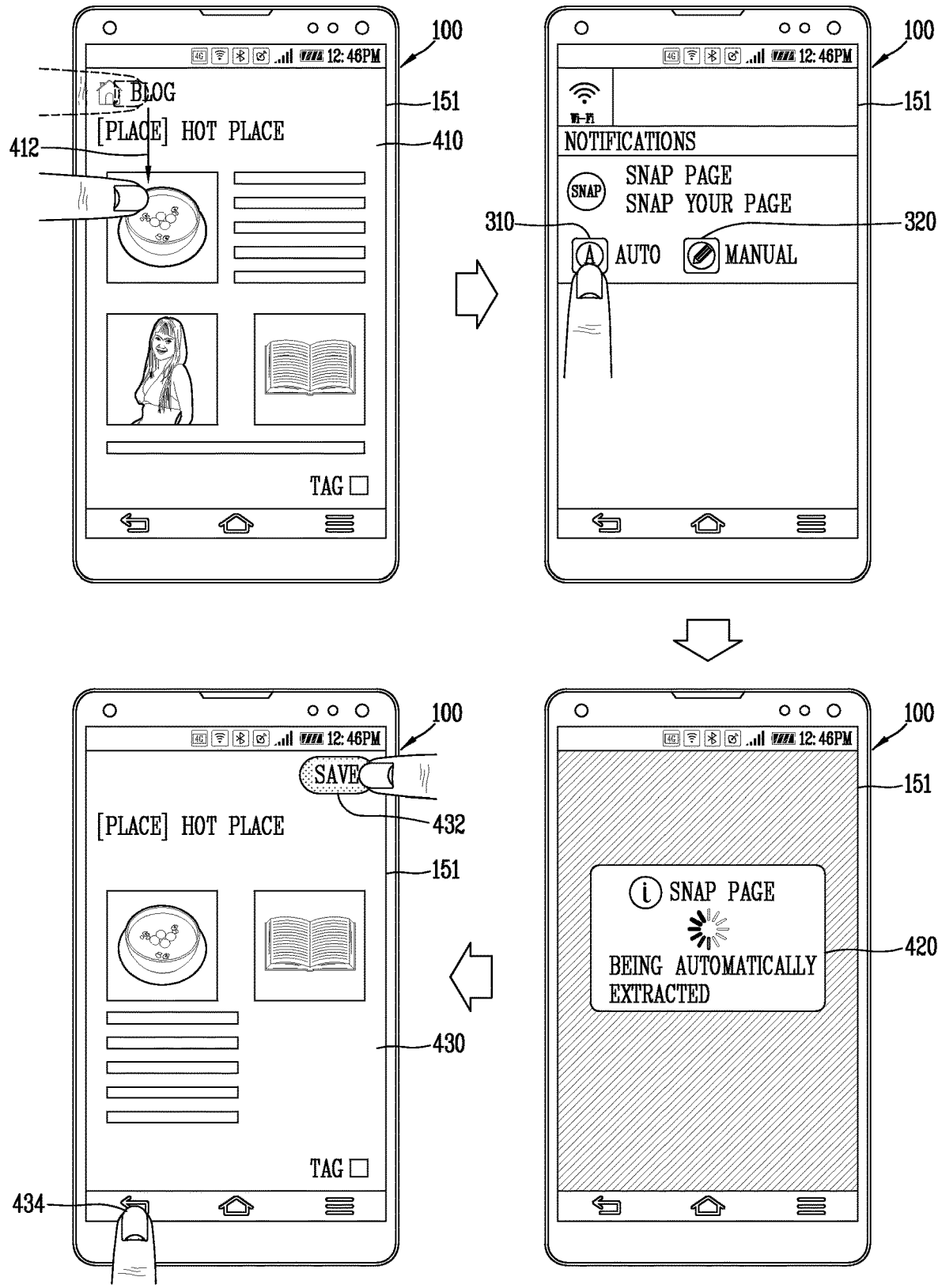
FIG. 4 is a conceptual view illustrating an exemplary embodiment of a user interface in which a scrap image is generated in an automatic scrap mode.

FIG. 4 is a conceptual view illustrating an exemplary embodiment of a user interface in which a scrap image is generated in the automatic scrap mode.

Referring to the first drawing of FIG. 4, the user may apply a drag input 412 to spread out the status bar, while searching for a web page 410 (first screen information).

Referring to the second drawing of FIG. 4, the automatic scrap mode icon 310 and the manual scrap mode icon 320 may be output on the status bar spread out according to the user's drag input 412. Subsequently, the user may touch the automatic scrap mode icon 310 output on the status bar to select the automatic scrap mode.

Referring to the third drawing of FIG. 4, when the user touches the automatic scrap mode icon 310, the control unit 180 may extract a keyword, a URL, a tag, a position, a contact number, and the like, of the web page 410, as meta data regarding the Web page 410, and select partial screen information included in the web page 410 on the basis of the extracted meta data.

In an exemplary embodiment, the control unit 180 may detect a significant region excluding an insignificant region such as an advertisement, a comment, and the like, and extract text, an image, and the like, from the detected significant region. Also, the control unit 180 may automatically summarize the body of the web page 410 into some sentences on the basis of keywords.

In another exemplary embodiment, the control unit may extract an image related to a keyword or a category from a plurality of images. Here, a banner, an advertisement, an icon, an emoticon, and the like, may be excluded.

In another exemplary embodiment, when the user searched for the web page 410 by inputting a search word to the Internet, the control unit 180 may extract a keyword of the web page 410 by weighting the corresponding search word.

Subsequently, the control unit 180 generates a scarp image (second screen information) including the selected partial screen information.

While the control unit 180 is generating the scrap image, a message 420 indicating that the scrap image is being generated may be output on the screen 151.

Referring to the fourth drawing of FIG. 4, the scrap image 430 generated in the automatic scrap mode may be output. In an exemplary embodiment, the scrap image 430 may include text or some of images which have been included in the web page 410.

In another exemplary embodiment, when the user touches a storage icon 432 output on the scrap image 430, the scrap image 430 may be stored in the memory 170.

In another exemplary embodiment, when the user pushes or presses a back key 434, the mobile terminal may be switched to the manual scrap mode. Accordingly, the user may edit the scrap image 430 in the manual scrap mode.

Meanwhile, in response to a preset touch input applied to the manual scrap icon, the display unit 151 may output a scrap window allowing the user to select some screen information included in the first screen information.

Also, in response to the preset touch input applied to the manual scrap icon, the control unit 180 may extract meta data regarding the first screen information, select (1-1)th screen information, partial screen information, included in the first screen information, on the basis of the extracted data, and control the display unit 151 to output the selected (1-1)th screen information on the scrap window.

Subsequently, in response to a preset touch input applied to the (1-2)th screen information, partial screen information, included in the first screen information, the control unit 180 may control the display unit 151 to output the (1-2)th screen information on the scrap window.

Thereafter, in response to a preset touch input applied to a manual scrap completion icon for completing selection of the partial screen information included in the first screen information, the control unit 180 may generate third screen information including the (1-1)th screen information and the (1-2)th screen information which have been output on the scrap window, and control the display unit 151 to output the generated third screen information.

Figure 5A:
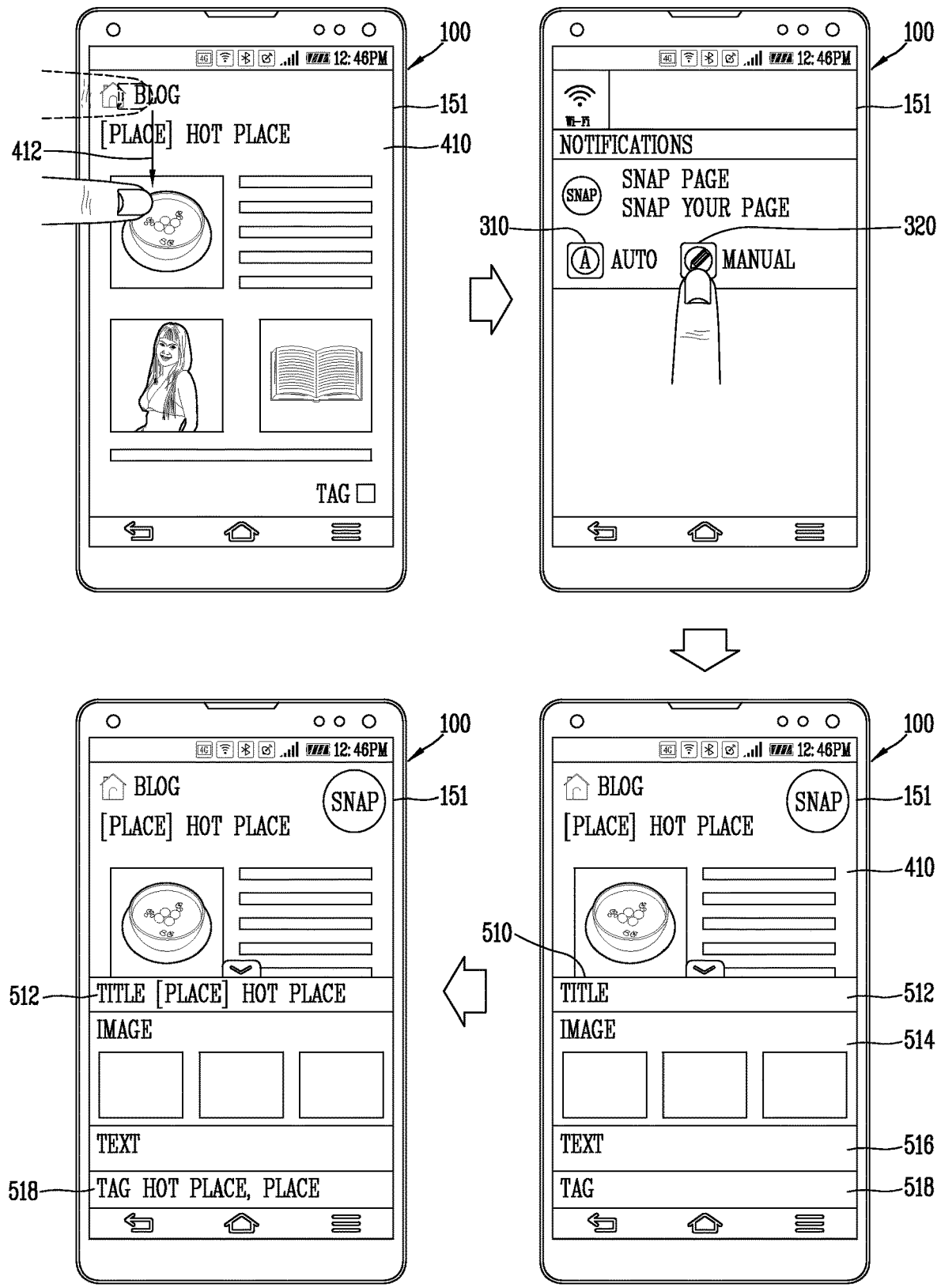
FIGS. 5A, 5B and 5C are conceptual vies illustrating an exemplary embodiment of a user interface in which a scrap image is generated in a manual scrap mode.
Figure 5B:
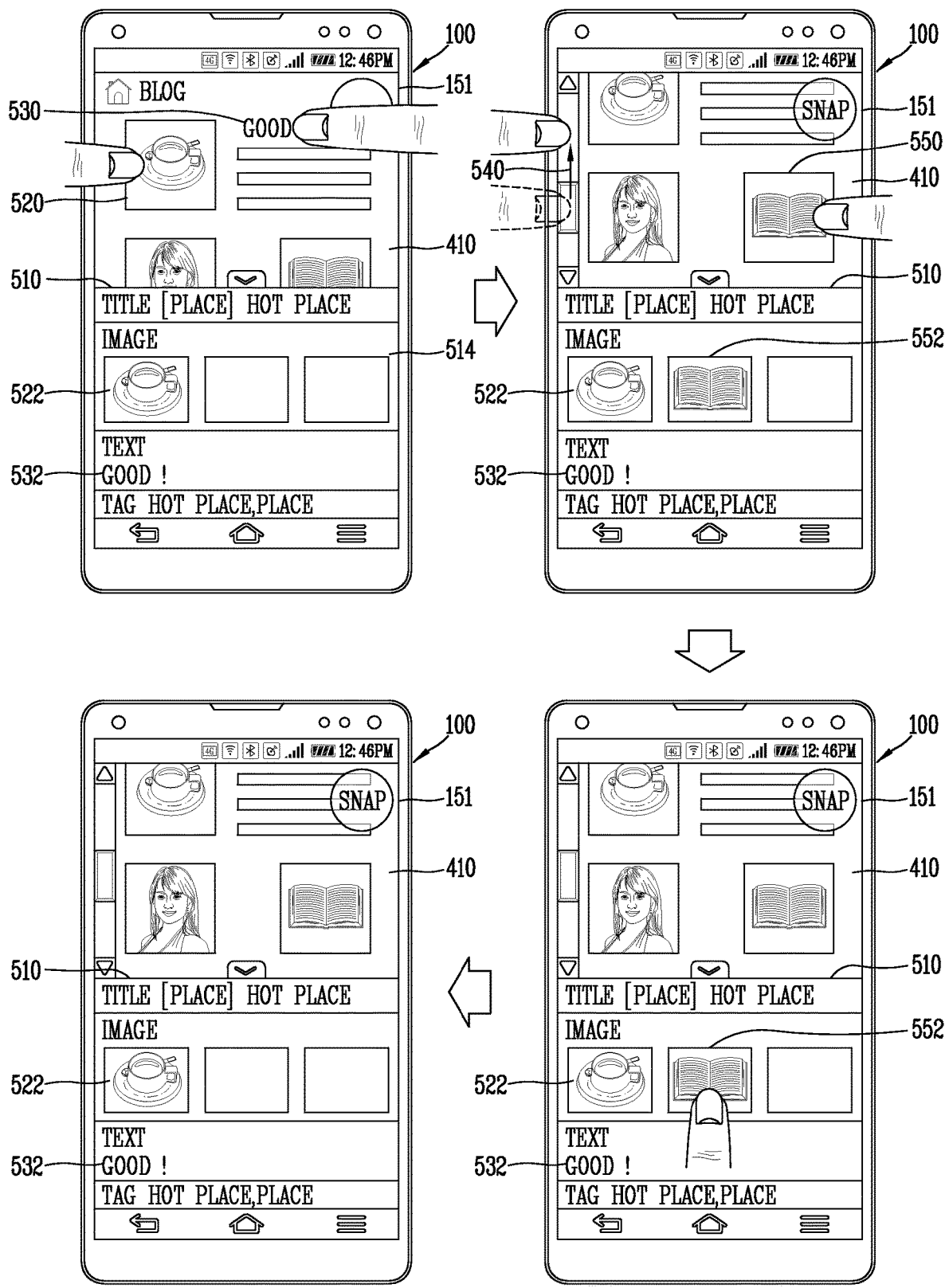
Figure 5C:
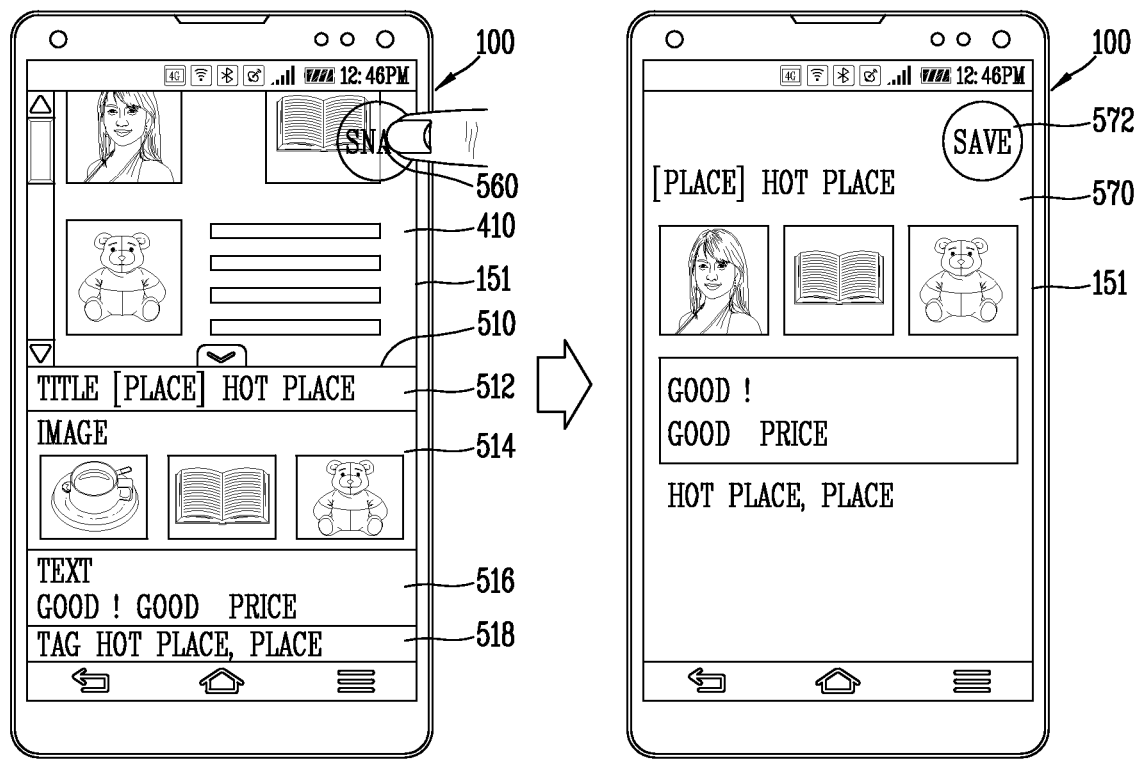

FIGS. 5A, 5B and 5C are conceptual views illustrating an exemplary embodiment of a user interface in which a scrap image is generated in a manual scrap mode.

Referring to the first drawing of FIG. 5A, likewise as in the first drawing of FIG. 4, the user may apply a drag input 412 to spread out the status bar, while searching for a web page 410 (the first screen information).

Referring to the second drawing of FIG. 5A, the automatic scrap mode icon 310 and the manual scrap mode icon 320 may be output in the status bar spread out according to the user's drag input 412. Subsequently, the user may touch the manual scrap mode icon 320 output on the status bar to select the manual scrap mode.

Referring to the third drawing of FIG. 5A, when the user touches the manual scrap mode icon 320, a scrap window 510 may be output on a lower portion of the web page 410. In an exemplary embodiment, as the scrap window 510 is output, the lower portion of the web page 410 may be covered by the scrap window 510.

In another exemplary embodiment, the scrap window 510 may be output in a translucent state such that contents of the region of the web page 410 covered by the scrap window 510 may be visible dimly.

In another exemplary embodiment, the region of the web page 410 may be reduced such that the web page 410 cannot be covered, and the scrap window 510 may be output to a region generated as the output region of the web page 410 is reduced.

Also, regions 512, 514, 516, and 518, on which selected partial screen information is output, may be output on the scrap window 510. For example, the region 512 on which an automatically extracted title is output, the region 514 on which an image selected by the user is output, the region 516 on which text selected by the user is output, and the region 518 on which an automatically extracted tag is output, may be output on the scrap window 510.

Referring to the fourth drawing of FIG. 5A, when the user touches the manual scrap mode icon 320, the control unit 180 may extract a keyword, a URL, a tag, a position, a contact number, and the like, as meta data regarding the web page 410 and select partial screen information included in the web page 410 on the basis of the extracted meta data.

Accordingly, a title and a tag may be output to the region 512 on which the automatically extracted title, as selected partial screen information, is output and the region 518 on which the automatically extracted tag, as selected partial screen information, is output, respectively.

That is, also, in the manual scrap mode, the meta data may be extracted, and on the basis of the extracted meta data, partial information such as the title, the tag, and the like, may be automatically selected and output to the scrap window 510.

Subsequently, referring to the first drawing of FIG. 5B, the user may apply a long touch input to select an image 510 included in the web page 410. Accordingly, a selected image 522 may be output to the region 514 of the scrap window 510 on which an image selected by the user is to be output.

Also, a visual effect indicating that the corresponding image 520 has been selected may be temporarily output in the web page 410. In an exemplary embodiment, a flickering virtual effect may be displayed in the edges of the selected image 520.

Similarly, the user may apply a long touch input to select the text 530 included in the web page 410. Accordingly, selected text 532 may be output to the region 516 of the scrap window 510 on which text selected by the user is to be output.

Also, a visual effect indicating that the corresponding text 530 has been selected may be output on the web page 410. In an exemplary embodiment, a text block including the selected text 530 may be displayed.

Referring to the second drawing of FIG. 5B, the user may apply a scroll input 540 to search for the web page 410 to select screen information to be added.

Subsequently, when the user applies a long touch input to select an image 550 included in the web page 410, a selected image 552 may be output on the region 514 of the scrap window 510 to which an image selected by the user is to be output.

Also, a visual effect indicating that the corresponding image 550 has been selected may be temporarily output to the web page 410. In an exemplary embodiment, a dim visual effect may be displayed in the selected image 550.

Referring to the third drawing of FIG. 5B, when the user applies a long touch to select the image 552 output on the scrap window 510, selection of the corresponding image may be released.

Referring to the fourth drawing of FIG. 5B, the corresponding image 552 disappears from the scrap window 510 by the long touch input in the third drawing of FIG. 5B. As a result, the corresponding image 552 may be excluded in the scrap image to be generated.

Similarly, when the user applies a long touch input to select the text 532 output on the scrap window 510, selection of the corresponding text is released and the corresponding text 532 disappears from the scrap window 510. As a result, the corresponding text is excluded from a scrap image to be generated.

Referring to the first drawing of FIG. 5C, after the user completes selection of an image, text, or the like, in the web page 410, the user may touch a snap icon 560 (a manual scrap completion icon). Accordingly, a scrap image (a third screen information) may be generated on the basis of visual information which has been output on the scrap window 510.

Referring to the second drawing of FIG. 5C, a generated scrap image 570 may be output. In an exemplary embodiment, the scrap image 570 may include visual information the same as those included in the scrap window 510.

In another exemplary embodiment, the scrap image 570 may include the visual information such as those included in the scrap window 510, and here, the visual information of the scrap image 570 may be disposed in a manner different from that of the scrap window 510.

Also, the user may touch a storage icon 572 to store the generated scrap image 570 in the memory 170.

Meanwhile, in response to a preset touch input applied to partial screen information included in the second screen information, the control unit 180 may generate fourth screen information obtained by editing the second screen information such that screen information related to the partial screen information is included, and control the display unit 151 to output the generated fourth screen information.

Figure 6:
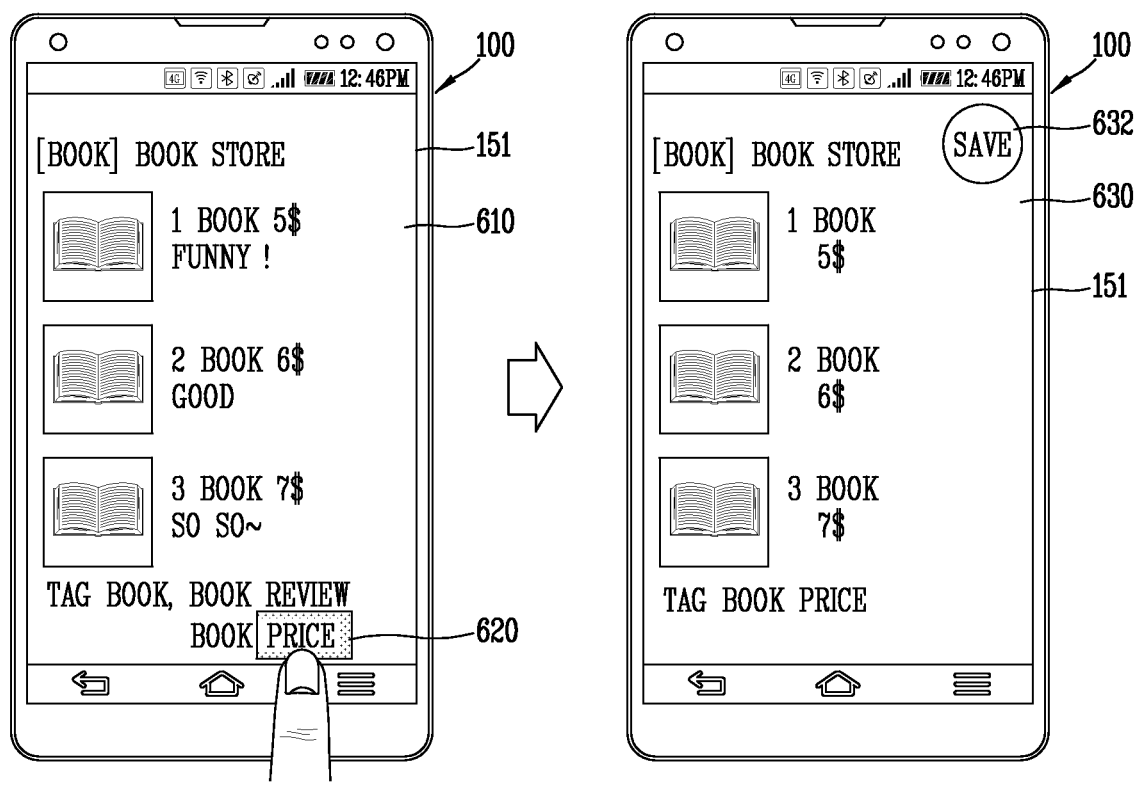
FIG. 6 is a conceptual view illustrating an exemplary embodiment of a user interface in which a scrap image generated in the automatic scrap mode is edited.

FIG. 6 is a conceptual view illustrating an embodiment of a user interface in which a scrap image generated in the automatic scrap mode is edited.

Referring to the first drawing of FIG. 6, the user may select a particular object included in a scrap image 610 generated in the automatic scrap mode. In detail, the user may apply a long touch input to particular text 620 to select the same, and a text block may be output to the particular text 620 according to the long touch input.

Referring to the second drawing of FIG. 6, the control unit 180 may edit the scrap image 610 by weighting the text 620 selected by the user, and control the display unit 151 to output an edited scrap image 630.

In an exemplary embodiment, the user may apply a long touch input to a price 620 in the scrap image 610 in which book review and book prices of books have been output, to select the same. Accordingly, the control unit 180 may edit the scrap image 610 by weighting the price 620 of the book selected by the user, and output an edited scrap image 630. In detail, the scrap image 630 edited on price, excluding book review, may be output.

In another exemplary embodiment, a scrap image generated in the automatic scrap mode may be edited by entering the manual scrap mode. In detail, the user may enter the manual scrap mode (please refer to FIG. 5A) and select partial visual information to be clipped from the scrap image generated in the automatic scrap mode.

Also, the scrap image generated in the manual scrap mode may also be edited according to the exemplary embodiment described above with reference to FIG. 6. In an exemplary embodiment, when the user selects a particular image included in the scrap image generated in the manual scrap mode, a new scrap image edited by weighting the particular image may be output.

Meanwhile, on the basis of an object selected by the user and meta data regarding each of a plurality of screen information stored in the memory 170, the control unit 180 may extract at least one screen information related to the selected object, and control the display unit 151 to output the at least one extracted screen information.

Also, the display unit 151 may output at least one among an icon for sharing the second screen information, an icon for outputting the first screen information, an icon for outputting a position extracted from the second screen information, and an icon for making a call to a contact number extracted from the second screen information, together with the second screen information.

Figure 7A:
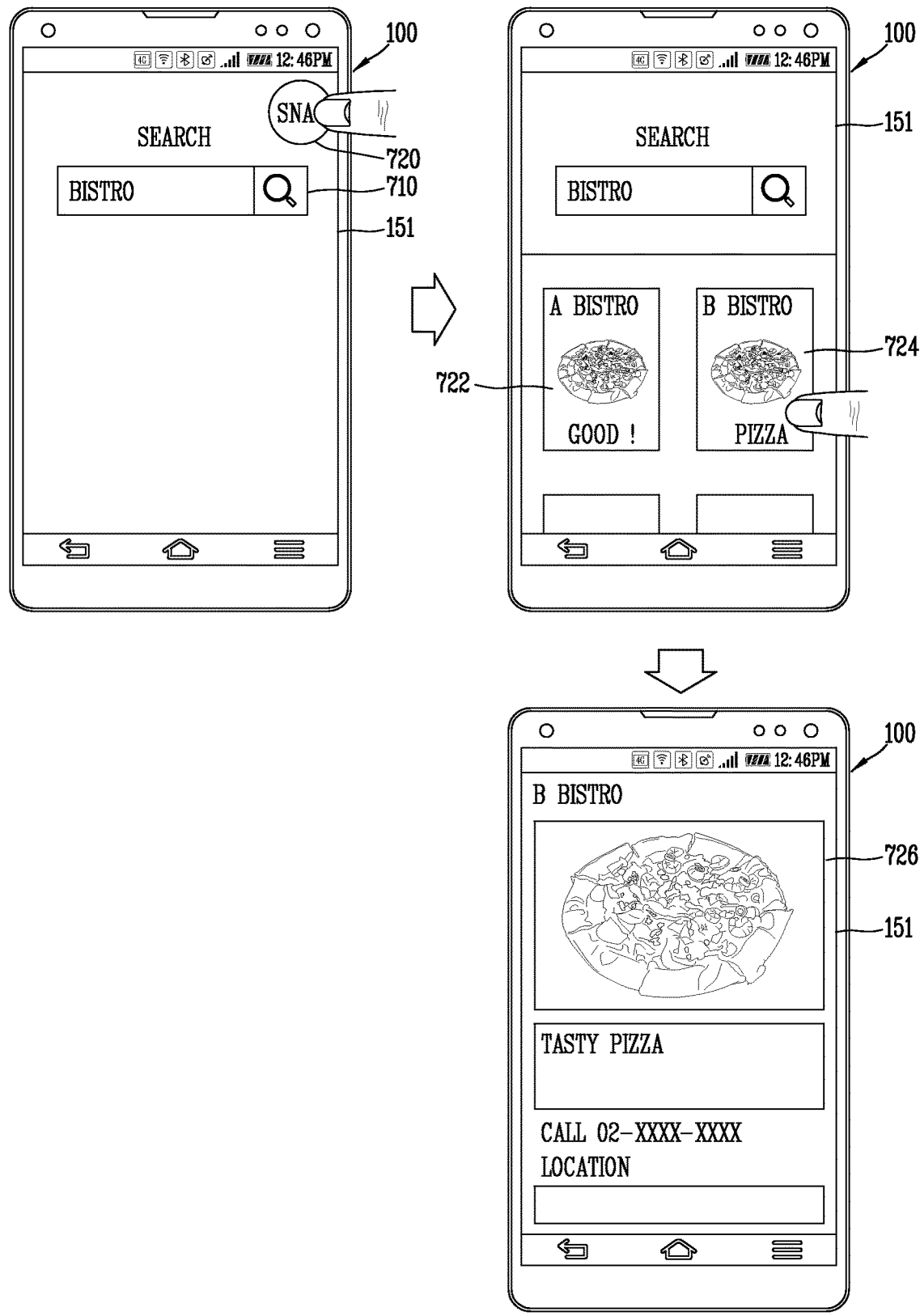
FIGS. 7A, 7B, and 7C are conceptual views illustrating an exemplary embodiment in which stored scrap images are used in searching a web.
Figure 7B:
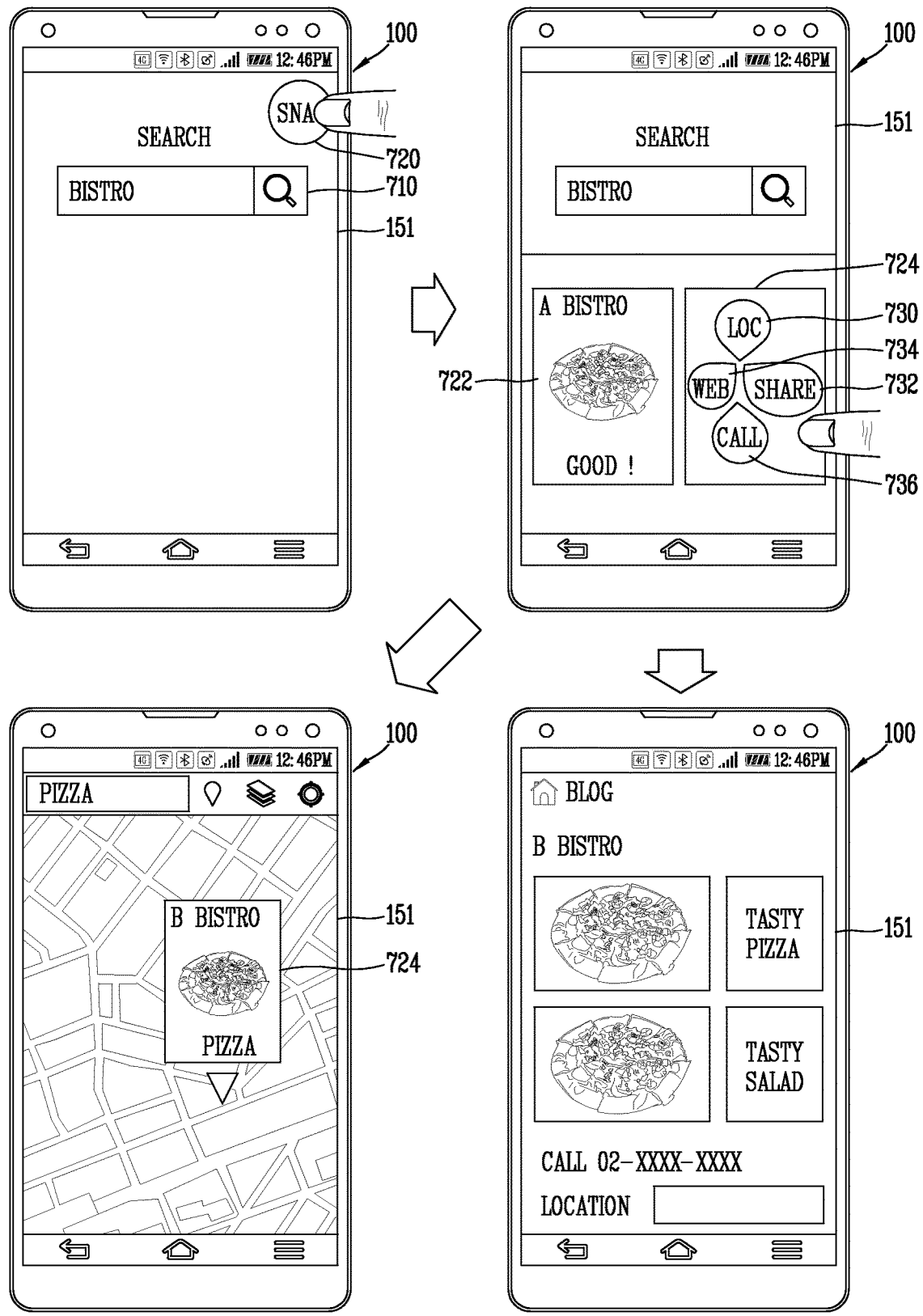
Figure 7C:
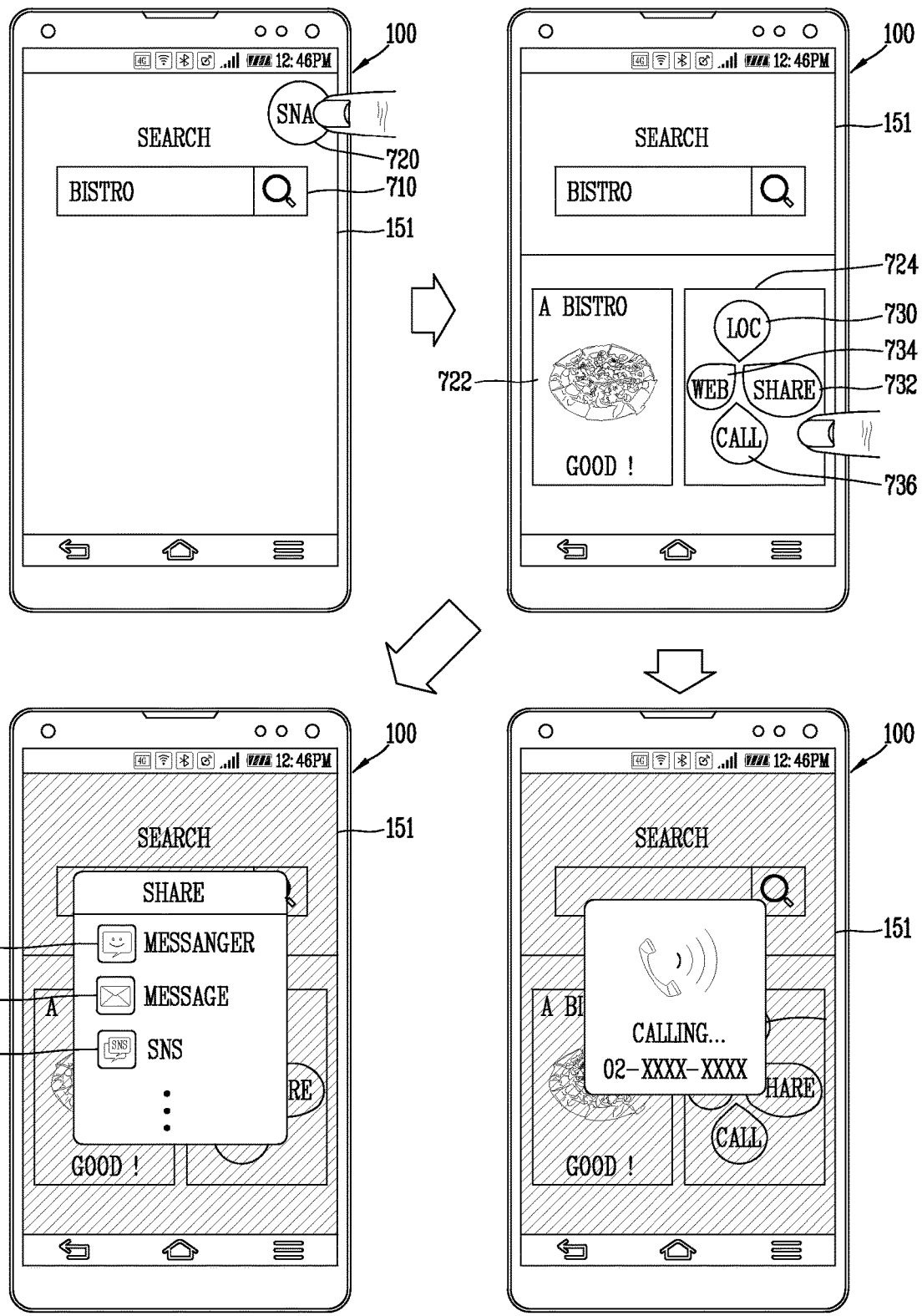

FIGS. 7A, 7B, and 7C are conceptual views illustrating an exemplary embodiment in which stored scrap images are used in searching a web.

Referring to the first drawing of FIG. 7A, the user may input a search word 710 in a web page and subsequently touch a snap icon 720 output in a pop-up manner on the screen 151.

Referring to the second drawing of FIG. 7A, thumbnail images 722 and 724 corresponding to scrap images related to the input search word 710 may be output.

In an exemplary embodiment, scrap images including contents identical or similar to the input search word 710, as a keyword, may be searched and thumbnail images 722 and 724 corresponding to the searched scrap images may be output.

In an exemplary embodiment, the thumbnail images 722 and 724 may be output to a higher layer covering a region of the web page which has been output. Here, the user may apply a short touch input to the thumbnail image 724 among the thumbnail images 722 and 724, to select the same.

Referring to the third drawing of FIG. 7A, a scrap image 726 corresponding to the selected thumbnail image 724 may be output. The scrap image 726 may be screen information generated in the automatic scrap mode or the manual scrap mode described above.

Referring to the first drawing of FIG. 7B, likewise as in the first drawing of FIG. 7A, the user may input a search word 710 and subsequently touch the snap icon 720 output in a pop-up manner in the screen 151.

Referring to the second drawing of FIG. 7B, likewise as in the second drawing of FIG. 7A, thumbnail images 722 and 724 corresponding to scrap images related to the input search word 710 may be output. In an exemplary embodiment, the thumbnail images 722 and 724 may be output to a higher layer covering a region of the web page which has been output.

Here, when the user applies a long touch input to the thumbnail image 724 among the thumbnail images 722 and 724, to select the same, icons 730, 732, 734, and 736 related to the scrap image corresponding to the selected thumbnail image 724 may be output.

Referring to the third drawing of FIG. 7B, when the user touches the web icon 734 to select the same, the original URL of the scrap image corresponding to the selected thumbnail image 724 may be output.

Referring to the fourth drawing of FIG. 7B, when the user touches the location icon 730 to select the same, an execution screen of a map application displaying a location extracted from the scrap image corresponding to the selected thumbnail image 724 may be output. In an exemplary embodiment, the selected thumbnail image 724 may be output to the extracted location.

Referring to the first drawing of FIG. 7C, likewise as in the first drawing of FIG. 7B, the user may input a search word 710 in the web page and subsequently touch the snap icon 720 output in a pop-up manner on the screen 151.

Referring to the second drawing of FIG. 7C, likewise as in the second drawing of FIG. 7B, the thumbnail images 722 and 724 corresponding to scrap images related to the input search word 710 may be output. In an exemplary embodiment, the thumbnail images 722 and 724 may be output to a higher layer covering a region of the web page which has been output.

Here, when the user applies a long touch input to the thumbnail image 724, among the thumbnail images 722 and 724, to select the same, icons 730, 732, 734, and 736 related to the scrap image corresponding to the selected thumbnail image 724 may be output.

Referring to the third drawing of FIG. 7C, when the user touches the call icon 736 to select the same, a call is made to a phone number extracted from the scrap image corresponding to the selected thumbnail image 724.

Referring to the fourth drawing of FIG. 7C, when the user touches a share icon 732 to select the same, a list of applications 740, 750, and 760 for sharing the scrap image corresponding to the selected thumbnail image 724 may be output.

In detail, a list of a messenger application 740, a message application 750, an SNS application 760, and the like, may be output. Here, when the user selects the messenger application 740, a scrap image corresponding to the thumbnail image 724 selected through the corresponding messenger application 740 may be shared.

Figure 8:
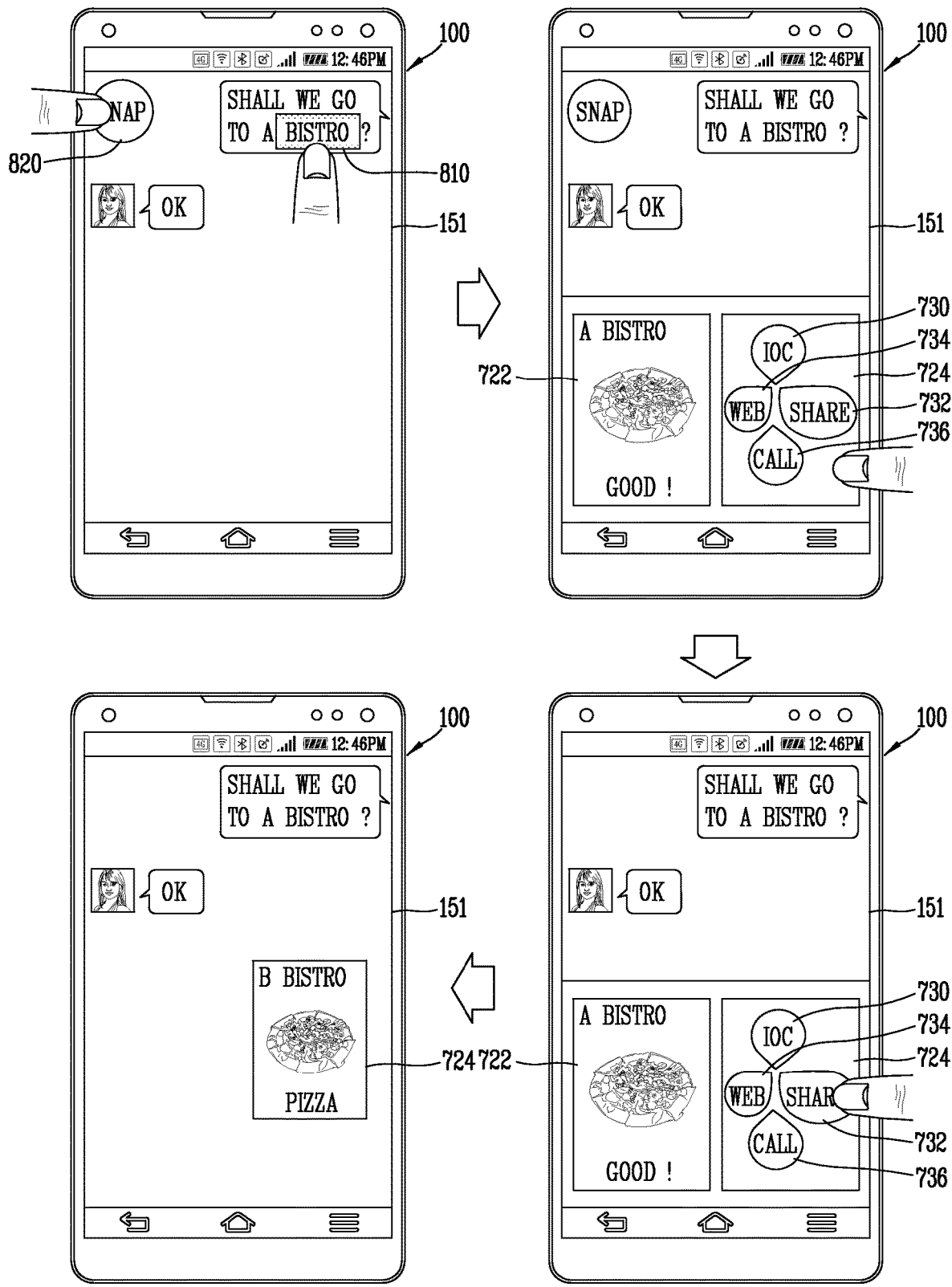
FIG. 8 is a conceptual view illustrating an exemplary embodiment in which a stored scrap image is transmitted when a messenger application is executed.

FIG. 8 is a conceptual view illustrating an exemplary embodiment in which a stored scrap image is transmitted when a messenger application is executed.

Referring to the first drawing of FIG. 8, the user may apply a long touch input to a particular word 810 to select the same in the conversation input through the messenger application. Subsequently, the user may touch a snap icon 820 to select the same.

Referring to the second drawing of FIG. 8, the control unit 180 may search the memory 170 for scrap images having the selected word 810 as a keyword or a word similar to the word 810 as a keyword and output thumbnail images 722 and 724 of the searched scrap images.

In an exemplary embodiment, the thumbnail images 722 and 724 may be output on a higher layer of the execution screen of the messenger application.

Subsequently, when the user applies a long touch input to the thumbnail image 724 among the thumbnail images 722 and 724 which has been output, icons 730, 732, 734, and 736 related to the scrap image corresponding to the selected thumbnail image 724 may be output.

Referring to the third drawing of FIG. 8, the user may touch the share icon 732 among the icons 730, 732, 734, and 736 related to the scrap image corresponding to the selected thumbnail image 724, to select the same.

Referring to the fourth drawing of FIG. 8, the selected thumbnail image 724 may be transmitted to a counterpart of the conversation. Accordingly, the counterpart of the conversation may touch the thumbnail image 724 to check the scrap image corresponding to the thumbnail image 724.

Meanwhile, as discussed above, the generated scrap image may be stored in the memory 170. In an exemplary embodiment, the user may designate a folder in which the scrap image is to be stored in a photo album (gallery) of the terminal 100.

In another exemplary embodiment, the control unit 180 may designate a folder in which the scrap image is to be stored, on the basis of the meta data of the scrap image and automatically store the scrap image in the folder. In detail, in a case in which "purchase of cosmetics" is extracted as a keyword of a scrap image, the control unit 180 may automatically store the scrap image in a "shopping" category folder.

Thereafter, the user may search for scrap images stored in the gallery (photo album) separately storing collected scrap images.

FIGS. 9A, 9B, 9C, and 9D are conceptual views illustrating an exemplary embodiment of a user interface related to a stored scrap image.

Figure 9A:
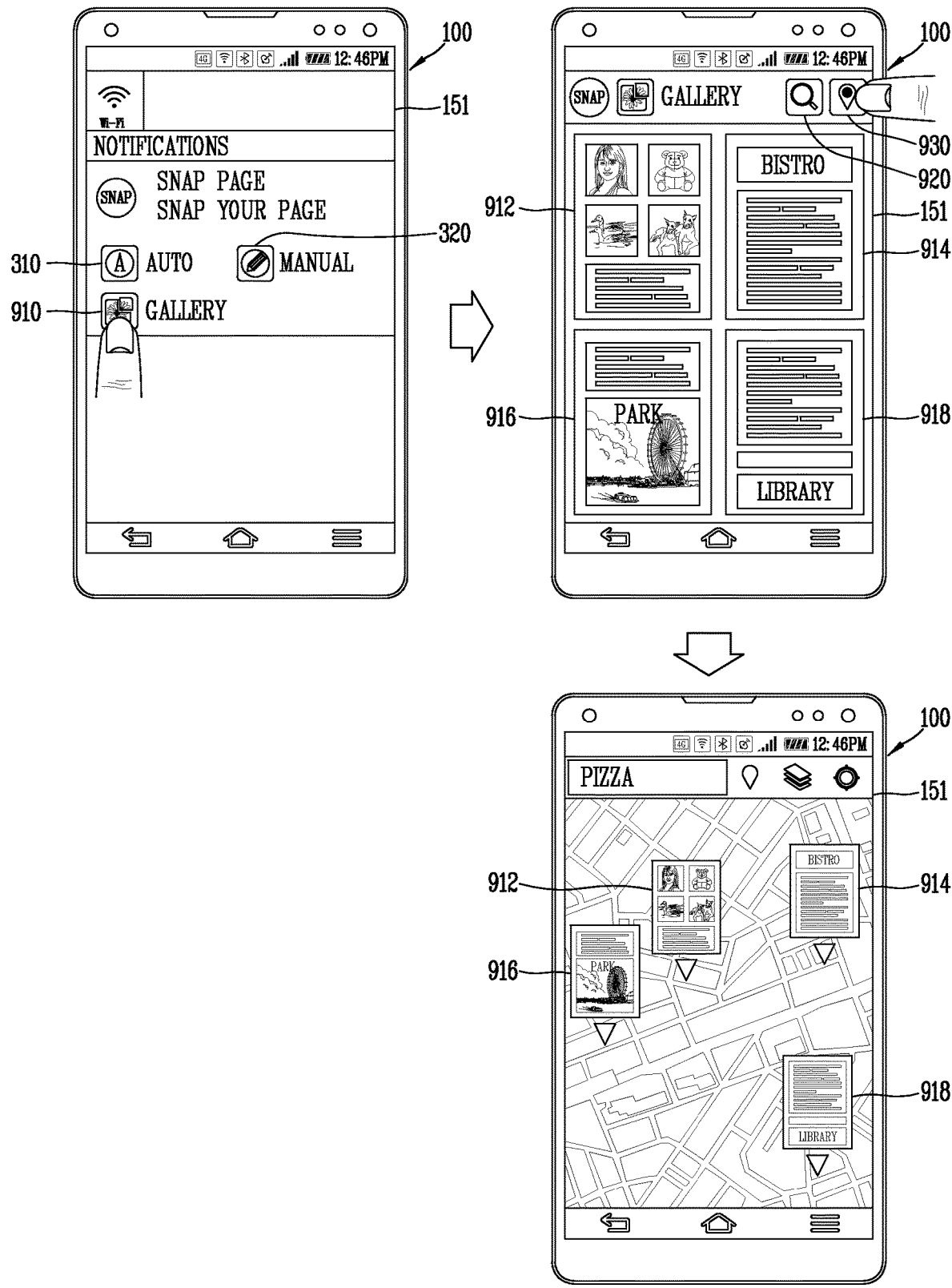
FIGS. 9A, 9B, 9C, and 9D are conceptual views illustrating an exemplary embodiment of a user interface related to a stored scrap image.

Referring to the first drawing of FIG. 9A, a gallery icon 910 regarding a scrap image may be output together with the automatic scrap icon 310 and the manual scrap icon 320 on the status bar. Here, the user may touch the gallery icon 910 to select the same.

Referring to the second drawing of FIG. 9A, when the gallery icon 910 is selected, a plurality of thumbnail images 912, 914, 916, and 918 respectively regarding a plurality of scrap images stored in the memory 170 may be output.

In an exemplary embodiment, the generated scrap images may be separately collected and stored in a separate gallery (photo album) and the generated scrap images may be checked in this gallery.

In another exemplary embodiment, a search icon 920 and a location indication icon 930 regarding the plurality of scrap images stored in the separate gallery may be output. Accordingly, the user may touch the location indication icon 930 to select the same.

Referring to the third drawing of FIG. 9A, when the location indication icon 930 is selected, an execution screen of a map application indicating locations extracted from the plurality of scrap images regarding the plurality of thumbnail images 912, 914, 916, and 918 output on the screen 151 of the second drawing of FIG. 9A may be output.

In an exemplary embodiment, in a case in which a location of a gallery is extracted from a first scrap image regarding the first thumbnail image 912 or from meta data of the first scrap image, the location of the gallery may be indicated on the output map. Here, the thumbnail image 912 may be output on the location of the gallery.

Also, in a case in which a location of a restaurant is extracted from a second scrap image regarding the second thumbnail image 914 or from meta data of the second scrap image, the location of the restaurant may be indicated on the output map. Here, the second thumbnail image 914 may be output on the location of the restaurant.

That is, the plurality of thumbnail images 912, 914, 916, and 918 may be output on the locations of the map extracted from the plurality of scrap images.

Figure 9B:
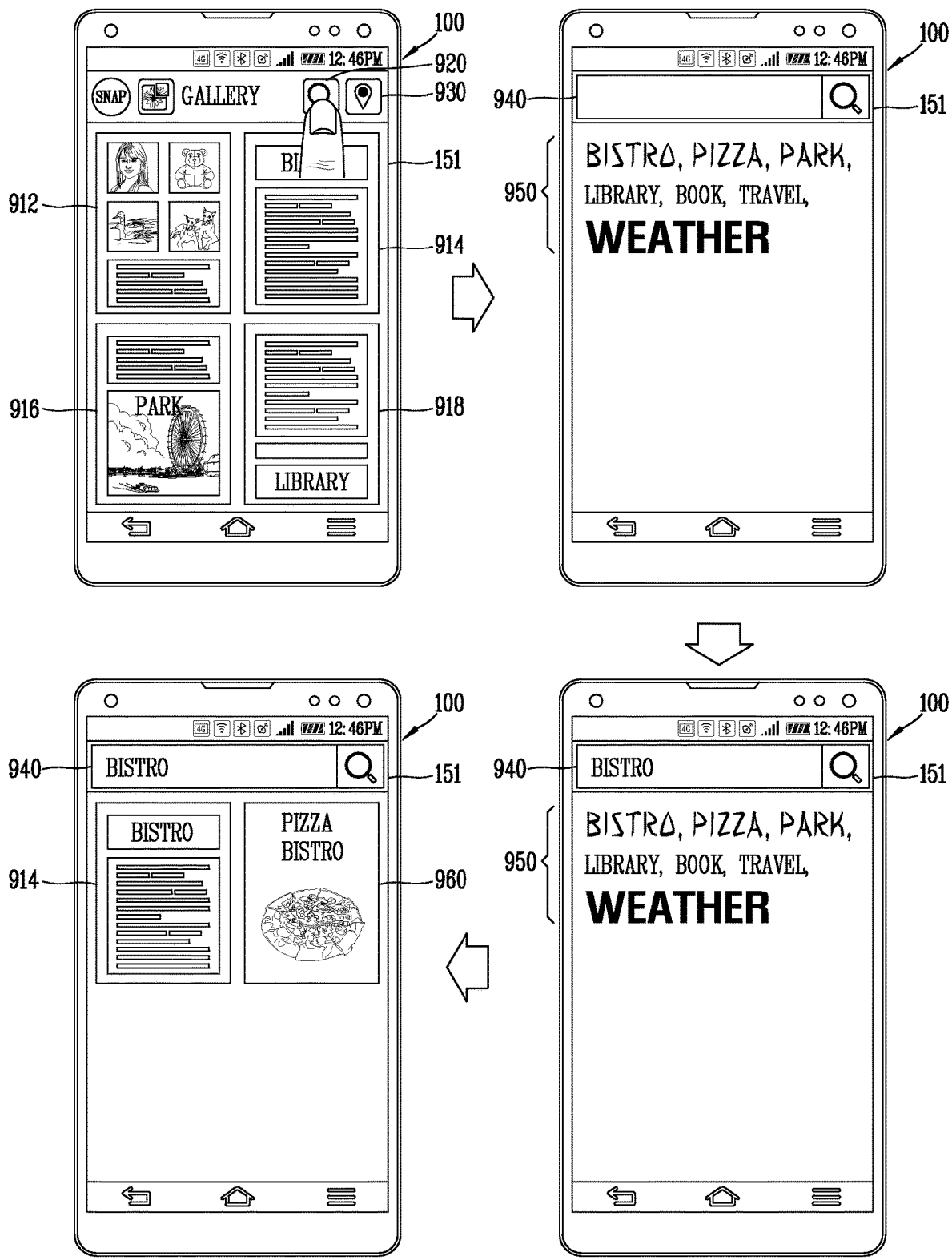

Referring to the first drawing of FIG. 9B, the search icon 920 and the location indication icon 930 regarding a plurality of scrap images stored in the separate gallery may be output. Accordingly, the user may touch the search icon 920 to select the same.

Referring to the second drawing of FIG. 9B, when the search icon 920 is selected, a search window 940 allowing for inputting of a search word may be output. Here, an aggregation of keywords (a keyword cloud 950) extracted from the plurality of scrap images or meta data regarding the plurality of scrap images may be output. In an exemplary embodiment, a keyword having higher frequency of extraction may be output in letters greater than those of other keywords.

Referring to the third drawing and the fourth drawing of FIG. 9B, the user may input contents intended to be searched, to the search window 940. Accordingly, thumbnail images 914 and 960 regarding scrap images related to the input search word may be output.

In an exemplary embodiment, the control unit 180 may search scrap images having the input search word as a keyword or a tag from the memory 170 and subsequently control the screen 151 to output the thumbnail images 914 and 960. Also, by using meta data of each scrap image, the control unit 180 may search scrap images having the input search word as a keyword or a tag from the memory 170.

Figure 9C:
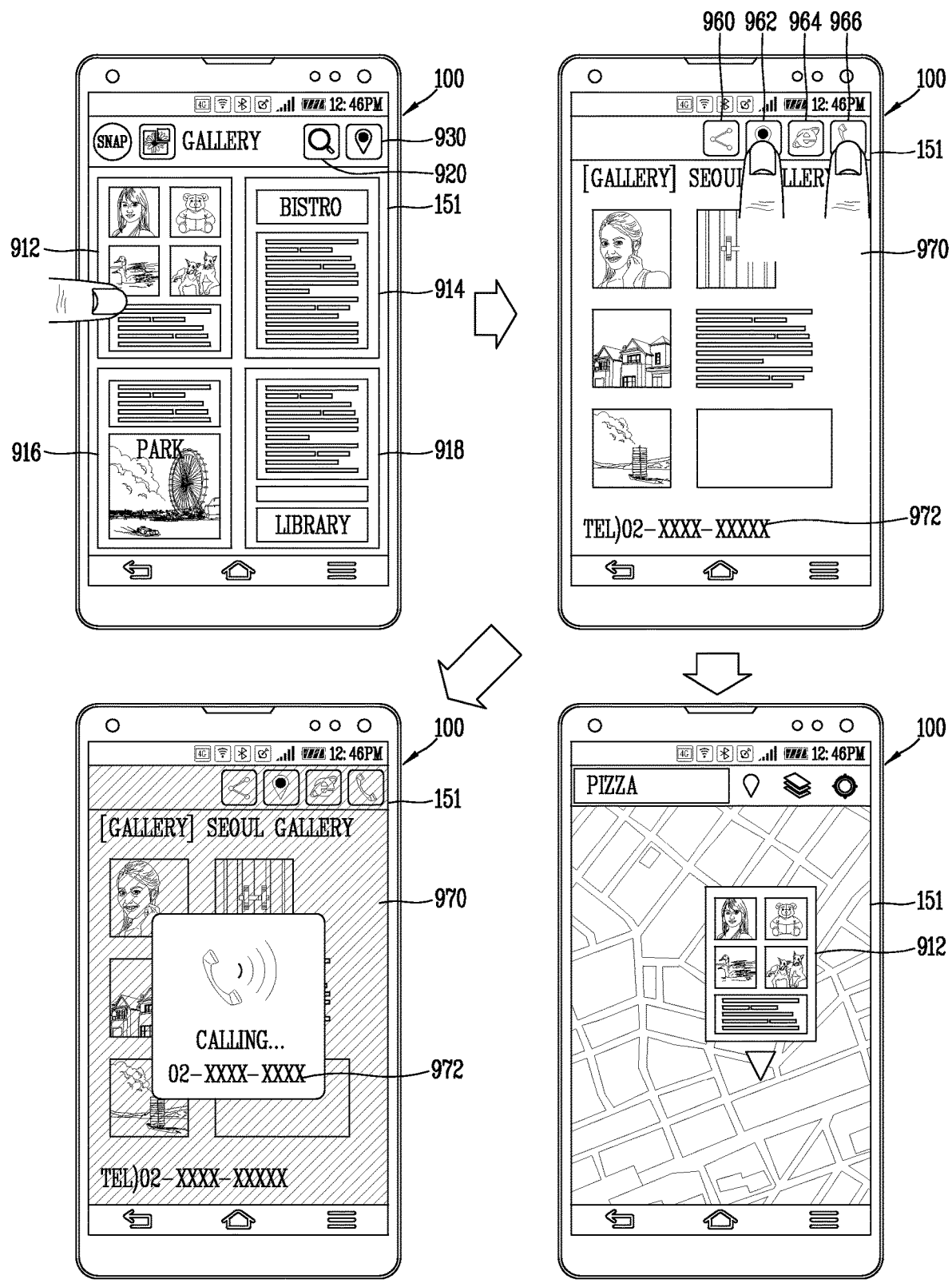

Referring to the first drawing of FIG. 9C, the user may touch the thumbnail image 912 among the thumbnail images 912, 914, 916, and 918 output from the separate gallery, to select the same.

Referring to the second drawing of FIG. 9C, a scrap image 970 regarding the selected thumbnail image 912 may be output. Also, an icon 960 for sharing the scrap image 970, an icon for outputting a location extracted from the scrap image 970, an icon 964 for outputting the original of the scrap image 970, and an icon 966 for making a phone call to a contact number extracted from the scrap image 970 may be output above the scrap image 970.

Referring to the third drawing of FIG. 9C, when the user touches the icon 962 for outputting a location extracted from the scrap image 970, to select the same, an execution screen of a map application displaying the extracted location may be output.

For example, when a location of an art museum is extracted from the scrap image 970 regarding an art museum, the thumbnail image 912 of the scrap image 970 may be output to the location of the art museum displayed on the map.

Referring to the fourth drawing of FIG. 9C, when the user touches the icon 966 for making a phone call to a contact number extracted from the scrap image 970, to select the same, a call is made to the extracted phone number.

For example, a phone number 972 of an art museum may be extracted from the scrap image 970 regarding the art museum, and a call is made to the corresponding phone number 972.

Figure 9D:
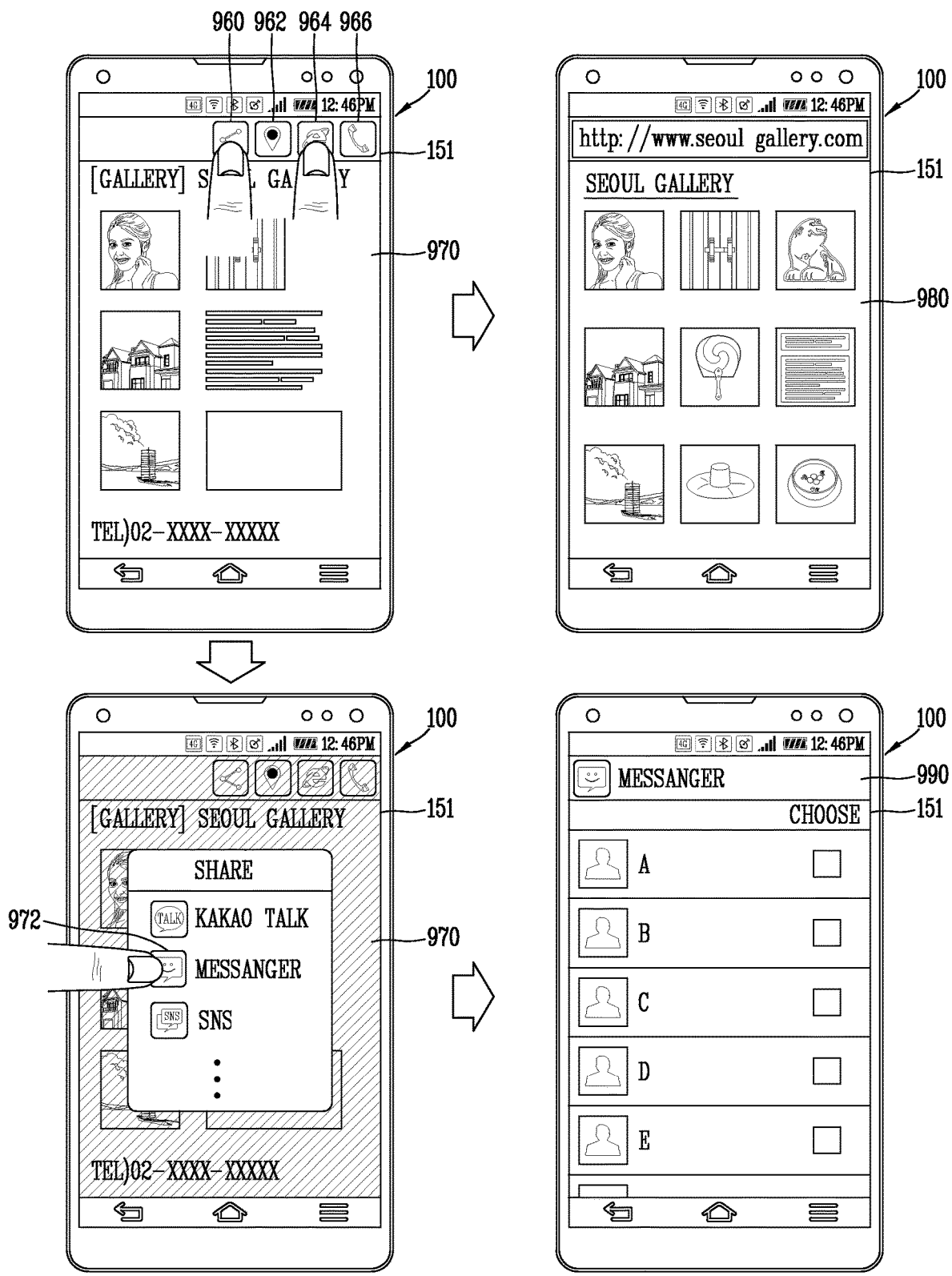

Referring to the first drawing of FIG. 9D, likewise as in the second drawing of FIG. 9C, the scrap image 970 regarding the selected thumbnail image 912, the icon 960 for sharing the scrap image 970, the icon for outputting a location extracted from the scrap image 970, the icon 964 for outputting the original of the scrap image 970, and the icon 966 for making a phone call to a contact number extracted from the scrap image 970 may be output.

Referring to the drawing on the top right of FIG. 9D, when the user touches the icon 964 for outputting the original of the scrap image 970, to select the same, the original screen 980 of the scrap image 970 may be output.

For example, in a case in which the scrap image 970 regarding the art museum has been generated from a home page 980 of the art museum, the home page 980 of the art museum may be output in response to the selection of the icon 964 for outputting the original of the scrap image 970.

Referring to the drawing on the bottom left of FIG. 9D, when the user touches the icon 960 for sharing the scrap image 970, to select the same, icons corresponding to applications that can be executed to share the scrap image 970 may be output.

Subsequently, the user may touch an icon 972, among the icons corresponding to the applications that can be executed to share the scrap image 970, to select the same.

For example, icons corresponding to a messenger application, a message application, and an SNS application may be output, and the user may touches the icon 972 of the messenger application to select the same.

Referring to the drawing on the bottom right of FIG. 9D, when the user touches the icon 972 of the messenger application to select the same, an executed screen 990 of the corresponding messenger application may be output. In an exemplary embodiment, a screen 151 for selecting a counterpart to which the scrap image 970 is intended to be transmitted through the corresponding messenger may be output.

In another exemplary embodiment, when the user touches the icon of the SNS application to select the same, the contents of the scrap image 970 may be edited to fit for a format of the corresponding SNS and posted on the SNS.

In detail, images included in the scrap image 970 may be output to a region in which an image is output in the corresponding SNS. Similarly, text included in the scrap image 970 may be output to a region in which text is output in the corresponding SNS.

Meanwhile, in response to a preset touch input applied to partial screen information included in the second screen information, the control unit 180 may control the display unit 151 to output a result of searching for partial screen information from a web page.

FIG. 10 is a conceptual view illustrating an exemplary embodiment of a user interface in which a particular object included in a scrap image is searched from a web page.

Referring to the first drawing of FIG. 10, the user may apply a long touch input to text 1010 included in a scrap image 610 to select the same. Here, a text block including the text 1010 may be output.

Referring to the second drawing of FIG. 10, icons corresponding to applications from which the selected text 1010 can be searched may be output, and the user may touch an icon 1020 among the icons to select the same.

Referring to the third drawing of FIG. 10, an execution screen 1030 of the selected application from which the text 1010 has been searched may be output.

In another exemplary embodiment, the user may apply a long touch input to an image included in the scrap image to select the same. Accordingly, a web page screen from which the selected image has been searched may be output.

Meanwhile, when the current location of the terminal 100 is within a preset range from a location extracted from the second screen information, the control unit 180 may control the display unit 151 to output a message indicating that the current location of the terminal 100 is close to the location extracted from the second screen information.

Figure 11:
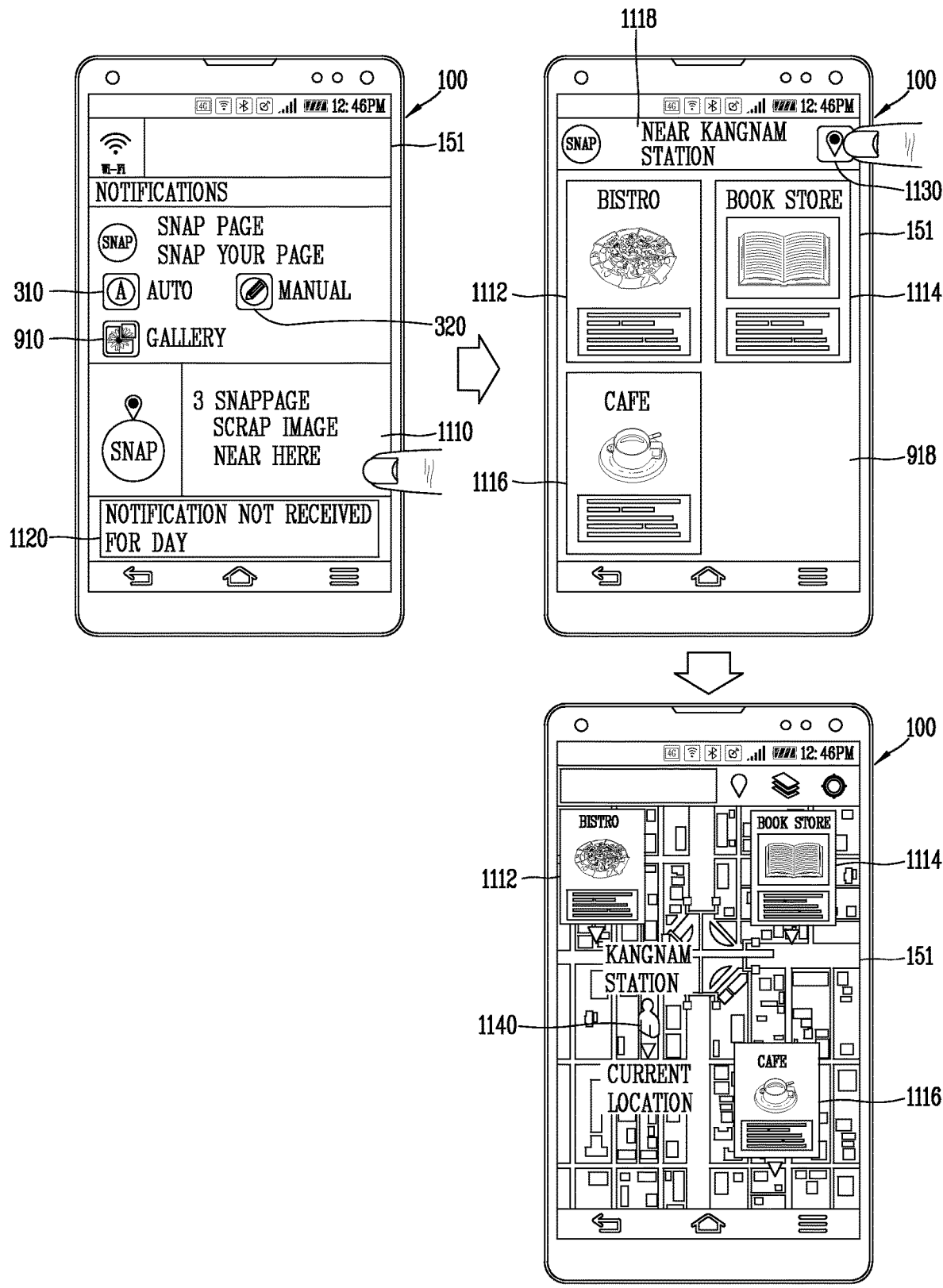
FIG. 11 is a conceptual view illustrating an exemplary embodiment of a user interface in which when a terminal is located in a location extracted from a scrap image, corresponding information is provided.

FIG. 11 is a conceptual view illustrating an exemplary embodiment of a user interface in which when a terminal is located in a position adjacent to a location extracted from a scrap image, corresponding information is provided.

Referring to the first drawing of FIG. 11, in a case in which locations extracted from scrap images stored in the memory 170 exist within a preset range from the current location of the terminal 100, a notification message 1110 indicating the corresponding fact may be output on the status bar.

For example, in a case in which locations extracted from three scrap images exist within a radius of 1 kilometers from the current location of the terminal 100, the notification message 1110 indicating the corresponding fact may be output on the status bar.

Meanwhile, it may be set such that the notification message 1110 is not received for a day. In detail, when the user touches a notification release message 1120 to select the same, even though locations extracted from scrap images exist within the preset range, the notification message 1110 is not received.

Referring to the second drawing of FIG. 11, when the user touches the notification message 1110 to select the same in the first drawing of FIG. 11, thumbnail images corresponding to scrap images including the current location 1118 of the terminal 100 and locations extracted to exist within the preset range from the current location 1118 may be output.

For example, in a case in which locations extracted from three scrap images are within a radius of 1 kilometers from the current location of the terminal 100, thumbnail images 1112, 1114, and 1116 corresponding to three scrap images may be output.

Referring to the third drawing of FIG. 11, when the user touches a location icon 1130 in the second drawing of FIG. 11 to select the same, the current location 1140 of the user (terminal) may be output on a map. Also, thumbnail images 1112, 1114, and 1116 respectively corresponding to the scrap images may be output on locations extracted from the scrap images.

For example, the current location 1140 of the terminal 100 and the locations of a restaurant, a bookstore, a café existing within a radius of 1 kilometers from the current location 1140 of the terminal 100 may be output. The locations of the restaurant, the bookstore, and the café are extracted from the scrap images stored in the memory 170, and the thumbnail images 1112, 1114, and 1116 respectively corresponding to the locations may be output.

Meanwhile, the control unit 180 may search content related to the second screen information from the memory 170 on the basis of the meta data regarding the second screen information, and control the display unit 151 to output the searched content.

Figure 12:
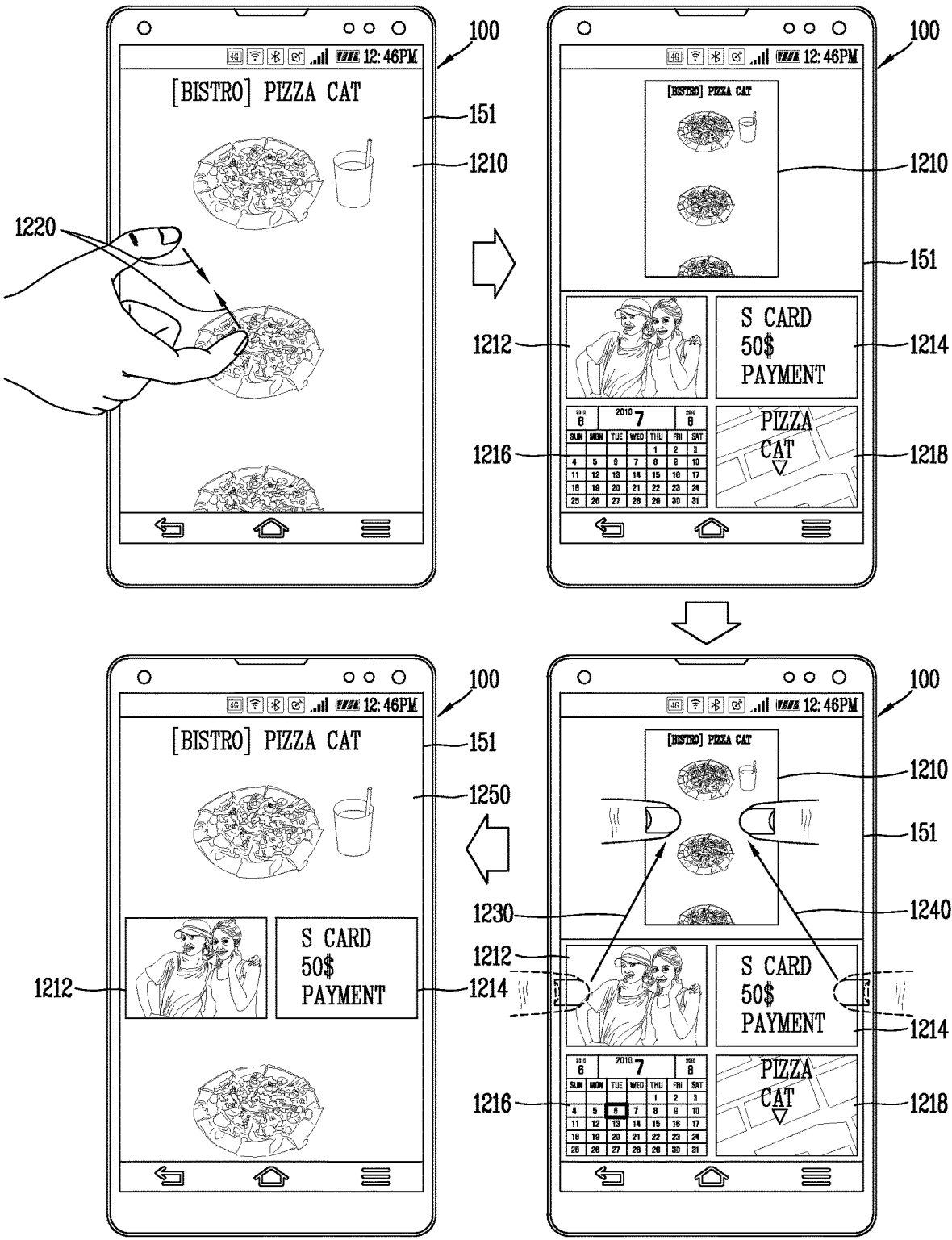
FIG. 12 is a conceptual view illustrating an exemplary embodiment of a user interface in which content related to a scrap image is output.

FIG. 12 is a conceptual view illustrating an exemplary embodiment of a user interface in which content related to a scrap image is output.

Referring to the first drawing and the second drawing of FIG. 12, when the user applies a pinch-in input 1220 to a scrap image 1210, the size of the scrap image 1210 may be reduced and content items 1212, 1214, 1216, and 1218 related to the scrap image 1210 may be output.

In an exemplary embodiment, in a case in which the scrap image 1210 is contents related to a restaurant, a photo image 1212 captured in the corresponding restaurant may be output as content associated with the scrap image 1210.

In detail, b y using the location information extracted from meta data of the scrap image 1210, the control unit 180 may search for the photo image 1212 captured in the corresponding restaurant among photo images stored in the memory 170.

In another method, in a case in which a name of the corresponding restaurant is included in tag information extracted from the scrap image 1210, the control unit 180 may search for a board photo image or a menu board photo image of the corresponding restaurant through image recognition.

In another method, the control unit 180 may search for a photo image of a receipt regarding payment in the corresponding restaurant from a phone number, a location, a name, and the like, of the restaurant extracted from the scrap image 1210.

In another exemplary embodiment, weather information corresponding to a date in which the photo image 1212 was captured may be output as content associated with the scrap image 1210.

In another exemplary embodiment, in a case in which the scrap image 1210 is contents related to a restaurant, a message 1214 regarding details a credit card used for payment in the corresponding restaurant may be output as content associated with the scrap image 1210.

In detail, in a case in which the location at which the message 1214 was received and the location of the restaurant are identical and a name of the corresponding restaurant is included in the message 1214, the control unit 180 may search for the message 1214 regarding the details of the credit card used in the corresponding restaurant, as content associated with the scrap image 1210.

In another exemplary embodiment, in a case in which the scrap image 1210 is contents regarding a restaurant, schedule contents 1216 regarding a date on which the corresponding restaurant is to visit may be output as content associated with the scrap image 1210 to a schedule application.

In another exemplary embodiment, in a case in which the scrap image 1210 is contents regarding a restaurant, a location image 1218 of the corresponding restaurant may be output as content associated with the scrap image 1210.

Also, meta data extracted from the content items 1212, 1214, 1216, and 1218 associated with the scrap image 1210 may be added to the meta data extracted from the scrap image 1210 and stored together.

For example, in a case in which the scrap image 1210 is contents regarding a restaurant, a URL of a home page of the corresponding restaurant, and a location, a phone number, and the like, of the restaurant may be extracted as meta data of the scrap image 1210.

Also, a date on which the user visited the corresponding restaurant, a person with which the user visited the restaurant together, details of payment with the use of a credit card in the corresponding restaurant, and the like, may be extracted as associated meta data of the content items 1212, 1214, 1216, and 1218, and these may be stored or output together with the meta data of the scrap image 1210.

For example, in the second drawing of FIG. 12, meta data extracted from the content items 1212, 1214, 1216, and 1218 associated with the meta data extracted from the scrap image 1210 may be output in an upper portion of the scrap image 1210. Also, the associated content items 1212, 1214, 1216, and 1218 may be output in a lower portion of the scrap image 1210.

Referring to the third drawing of FIG. 12, some content items 1212 and 1214 among the content items 1212, 1214, 1216, and 1218 associated with the scrap image 1210 may be selected.

In an exemplary embodiment, the user may apply a drag input 1230 to the photo image 1212 captured in the restaurant toward the scrap image 1210 to select the same. Similarly, the user may apply a drag input 1240 to a message 1214 regarding details of payment with the use of a credit card in the restaurant toward the scrap image 1210 to select the same.

Referring to the fourth drawing of FIG. 12, a scrap image 1250 additionally including the selected content items 1212 and 1214 may be output. In detail, the photo image captured in the restaurant and the message 1214 indicating details of payment with the use of a credit card in the restaurant may be added to the scrap image 1210 regarding the restaurant.

In another exemplary embodiment, in a case in which a plurality of images are generated by combining content items associated with a scrap image, when the user applies a long touch input to the scrap image, the size of the scrap image is reduced and the plurality of images generated by combining the content items may be output on the right side of the scrap image.

Meanwhile, user preference may be analyzed on the basis of a keyword calculated from a plurality of scrap images. In detail, user preference may be recognized by time and location.

Figure 13A:
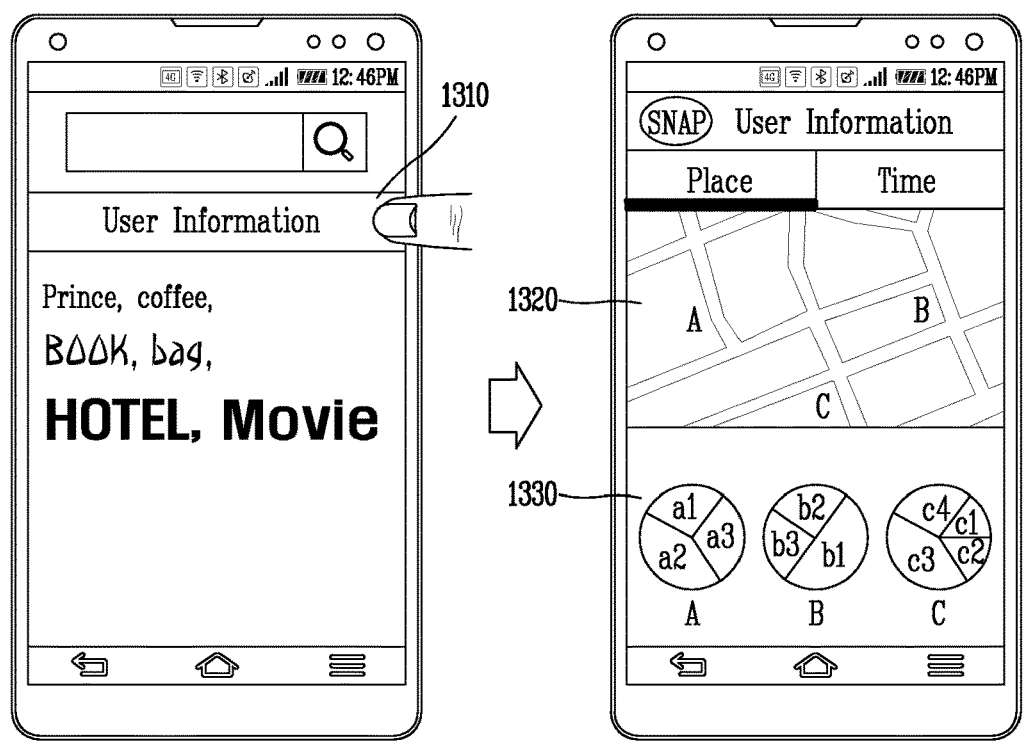
FIGS. 13A and 13B are conceptual views illustrating an exemplary embodiment in which user preference is analyzed on the basis of a scrap image.
Figure 13B:
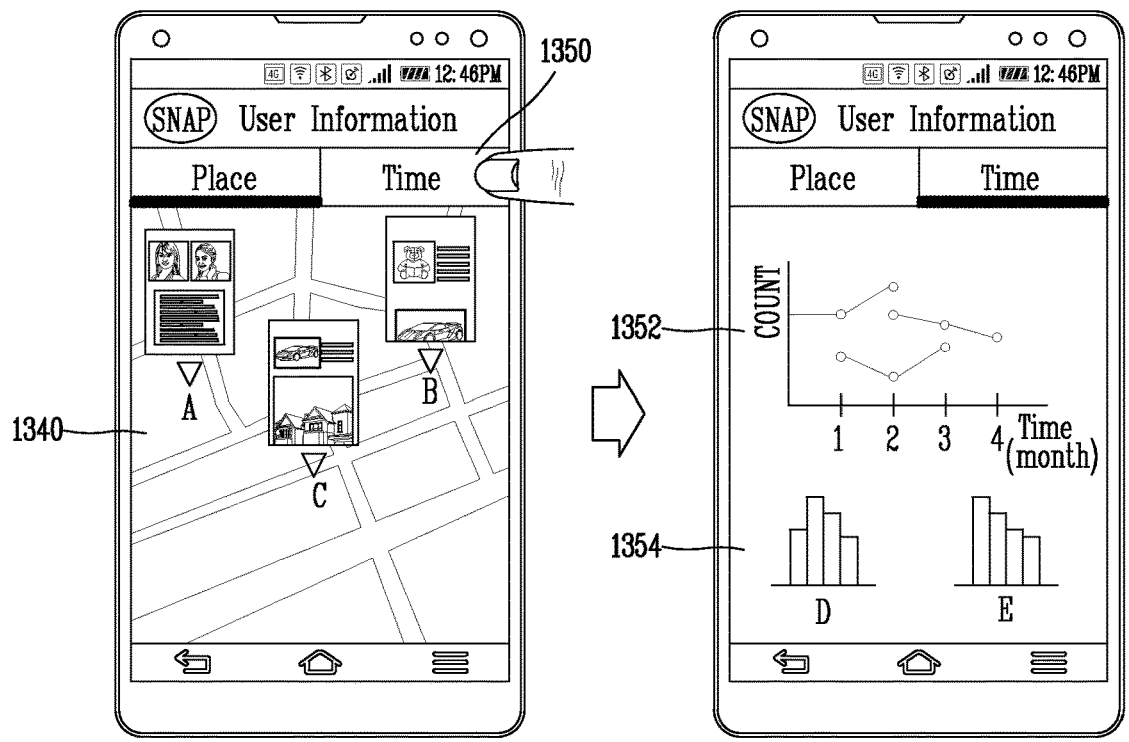

FIGS. 13A and 13B are conceptual views illustrating an exemplary embodiment in which user preference is analyzed on the basis of a scrap image.

Referring to the first drawing of FIG. 13A, likewise as in the first drawing and the second drawing of FIG. 9B, a plurality of scrap images stored in a separate gallery may be searched.

Here, an aggregation of keywords (keyword cloud) extracted from the plurality of stored scrap images or meta data regarding the plurality of scrap images may be output. In an exemplary embodiment, a keyword having higher frequency of extraction may be output in letters greater than those of other keywords.

Also, a user information menu 1310 showing a result obtained by analyzing user preference may be output, and the user may touch the user information menu 1310 to select the same.

Referring to the second drawing of FIG. 13A, in a case in which information regarding a location or point of interest (POI) information is included in the aggregation of the keywords extracted from the plurality of scrap images or meta data regarding the plurality of scrap images, user's interested area may be recognized.

In detail, the user's interested area, the user's concerns in the interested area (user's concerns related to the interested area), or features may be recognized.

In an exemplary embodiment, an area A, an area B, and an area C may be extracted as user's interested areas and displayed on a map 1320. Also, circular graphs 1330ined by analyzing user's concerns in relation to each of the user's interested areas may be output In the circular graphs 1330, it may be determined that the user is interested in a1, a2, and a3 in relation to the area A, and degrees of interest in a1, a2, and a3 may be indicated through rates corresponding to the circular graphs 1330.

Referring to the first drawing of FIG. 13B, in another exemplary embodiment showing a user's interested area, thumbnail images of scrap images may be output to the user's interested area on the map so as to be displayed 1340. Also, the user may touch a time menu 1350 to select the same, by which user preference can be checked by time.

Referring to the second drawing of FIG. 13B, the number of keywords extracted by time slots may be indicated as a line graph 1352 or a bar graph 1354. In detail, a horizontal axis may represent time, and a vertical axis may represent the number of extracting keywords. Accordingly, user's concerns may be recognized in a short term or in a long term, whereby user's temporary concerns and user's continuous concerns may be distinguished.

In an exemplary embodiment, in a case in which the number of extracting keywords related to Cheju Island is significantly large in January and February, Cheju Island may be recognized as the user's temporary concerns.

In an exemplary embodiment, in a case in which the number of extracting keywords related to exercise is continuously noticeable, exercise may be recognized as the user's continuous concerns.

The mobile terminal and the control method thereof according to the present disclosure will be described.

According to at least one of the exemplary embodiments of the present disclosure, a scrap image may be automatically generated on the basis of meta data.

Also, according to at least one of the exemplary embodiments of the present disclosure, content related to scrap image may be automatically recommended, and a notification message indicating that the user (or the mobile terminal) is close to a location extracted from a scrap image can be received.

As a result, user convenience can be enhanced.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing exemplary embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described exemplary embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display to display an automatic scrap icon and a manual scrap icon; and
a controller to control the display based on an input at the automatic scrap icon or the manual scrap icon, wherein in response to the input at the automatic scrap icon, the controller is configured to:
extract metadata regarding first screen information,
select partial screen information from the first screen information based on the extracted metadata,
provide second screen information including the selected partial screen information, and
control the display to display the second screen information,
wherein the controller is further configured to:
search content related to the second screen information,
control the display to display the searched content,
receive a selection, by a user, of a content from among the searched content, and
provide the second screen information and add the selected content, and control the display to display the second screen information and the added selected content,
wherein the controller is further configured to:
edit the second screen information by weighting a text selected by a user, and control the display to output an edited second screen information,
when a location of the terminal is within a preset range from a location extracted from the second screen information stored in a memory, the controller controls the display to display a message relating to the location of the terminal being close to the location extracted from the second screen information,
when the message relating to the location of the terminal being close to the location extracted from the second screen information is touched, the display displays a thumbnail image corresponding to the second screen information and a location icon, and
when the location icon is touched, the display displays the current location of the user on a map, and the thumbnail image on the location extracted from the second screen information.

2. The mobile terminal of claim 1, wherein in response to the input at the manual scrap icon, the controller to:
control the display to display a scrap window for selecting partial screen information from the first screen information,
extract metadata regarding the first screen information,
select a first portion of screen information from the first screen information based on the extracted metadata,
display, at the scrap window, the selected first portion of screen information, and
select a second portion of screen information from the first screen information, and
display, at the scrap window, the second portion of the screen information.

3. The mobile terminal of claim 2, wherein in response to an input at a manual scrap completion icon for completing selection of screen information from the first screen information, the controller provides third screen information including the first portion of screen information and the second portion of screen information displayed at the scrap window, and controls the display to display the third screen information.

4. The mobile terminal of claim 1, wherein in response to an input at partial screen information from the second screen information, the controller provides fourth screen information by changing the second screen information such that the fourth screen information includes screen information related to the partial screen information, and controls the display to display the fourth screen information.

5. The mobile terminal of claim 1, wherein the controller extracts, as metadata regarding the first screen information, at least one of a keyword, a uniform resource locator (URL), a tag, a location, and a contact number.

6. The mobile terminal of claim 1, wherein the display displays the second screen information and at least one of an icon to share the second screen information, an icon to output the first screen information, an icon to output a location extracted from the second screen information, and an icon to make a call to a contact number extracted from the second screen information.

7. The mobile terminal of claim 1, wherein the controller to search content related to the second screen information based on the metadata regarding the first screen information, and the controller controls the display to display a result of the searched content.

8. The mobile terminal of claim 1, wherein in response to an input at partial screen information from the second screen information, the controller controls the display to display a result of searching the partial screen information from a web page.

9. The mobile terminal of claim 1, wherein based on an object selected by a user and metadata regarding each of a plurality of screen information, the controller extracts at least one screen information related to the selected object and controls the display to display the at least one extracted screen information.

10. A method for controlling a mobile terminal, the method comprising:
displaying, on a display, an automatic scrap icon and a manual scrap icon;
in response to an input at the automatic scrap icon, extracting metadata regarding a first screen information and selecting partial screen information from the first screen information based on the extracted metadata; and
providing second screen information that includes the selected partial screen information and displaying the second screen information on the display,
searching content related to the second screen information;
displaying the searched content;
receive a selection, by a user, of content from among the searched content;
providing the second screen information and adding the selected content, displaying the second screen information and the added content;
editing the second screen information by weighting a text selected by a user, and controlling the display to output the edited second screen information;
displaying a message relating to a current location of the terminal being close to a location extracted from the second screen information stored in a memory;
when the message relating to the current location of the terminal being close to the location extracted from the second screen information is touched, displaying a thumbnail image corresponding to the second screen information and a location icon; and
when the location icon is touched, displaying the current location of the user on a map, and the thumbnail image on the location extracted from the second screen information.

11. The method of claim 10, wherein in response to an input at the manual scrap icon, the method further comprising:
displaying a scrap window to select partial screen information from the first screen information;
extracting metadata regarding the first screen information;
selecting a first portion of screen information from the first screen information based on the extracted metadata;
displaying, at the scrap window at the display, the selected first portion of screen information;
selecting second portion of screen information from the first screen information; and
displaying, at the scrap window, the second portion of screen information.

12. The method of claim 11, wherein the providing of the second screen information and the displaying of the second screen information includes:
in response to an input at a manual scrap completion icon for completing selection of screen information from the first screen information, providing third screen information including the first portion of screen information and the second portion of screen information displayed at the scrap window, and displaying the third screen information.

13. The method of claim 10, further comprising:
receiving an input at partial screen information from the second screen information,
providing fourth screen information by changing the second screen information such that the fourth screen information includes screen information related to the partial screen information, and
displaying the fourth screen information.

14. The method of claim 10, wherein the extracting of the metadata and the selecting of the partial screen information includes:
extracting, as metadata of the first screen information, at least one of a keyword, a uniform resource locator (URL), a tag, a location and a contact number.

15. The method of claim 10, further comprising:
displaying the second screen information and at least one of an icon to share the second screen information, an icon to output the first screen information, an icon to output a location extracted from the second screen information, and an icon to make a call to a contact number.

16. The method of claim 10, further comprising:
searching content related to the second screen information based on the metadata regarding the first screen information, and
displaying information of the searched content.

17. The method of claim 10, further comprising:
receiving an input at partial screen information from the second screen information, and
displaying a result of searching the partial screen information from a web page.

18. A mobile terminal comprising:
a display to display an automatic scrap icon and a manual scrap icon; and
a controller configured to:
in response to an input at the automatic scrap icon, extract metadata regarding a first screen information, obtain partial screen information based on the extracted metadata, and display second screen information based on the partial screen information, and
in response to an input at the manual scrap icon, extract metadata regarding the first screen information, obtain partial screen information based on the extracted metadata, and display, at a scrap window, second screen information based on the partial screen information,
wherein the controller is further configured to:

search content related to the second screen information, control the display to display the searched content, receive a selection, by a user, of a content from among the searched content, provide the second screen information and add the selected content, and display the second screen information and the added selected content, edit the second screen information by weighting a text selected by a user, and control the display to output the edited second screen information, when a location of the terminal is within a preset range from a location extracted from the second screen information, the controller controls the display to display a message relating to the location of the terminal being close to the location extracted from the second screen information stored in a memory, when the message relating to the location of the terminal being close to the location extracted from the second screen information is touched, the display displays a thumbnail image corresponding to the second screen information and a location icon, and when the location icon is touched, the display displays the current location of the user on a map, and the thumbnail image on the location extracted from the second screen information.

* * * * *